(12) United States Patent
Tan et al.

(10) Patent No.: US 11,496,393 B2
(45) Date of Patent: Nov. 8, 2022

(54) METHOD AND APPARATUS FOR FORWARDING PACKET BASED ON INTEGRATED FLOW TABLE

(71) Applicant: HUAWEI TECHNOLOGIES CO., LTD., Guangdong (CN)

(72) Inventors: Kun Tan, Beijing (CN); Wei-Liang Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/725,247

(22) Filed: Dec. 23, 2019

(65) Prior Publication Data

US 2020/0136969 A1 Apr. 30, 2020

Related U.S. Application Data

(63) Continuation of application No. PCT/CN2019/080602, filed on Mar. 29, 2019.

(30) Foreign Application Priority Data

Mar. 31, 2018 (CN) .......................... 201810278226.6

(51) Int. Cl.
*H04L 45/74* (2022.01)
*H04L 12/46* (2006.01)
(Continued)

(52) U.S. Cl.
CPC .......... *H04L 45/74* (2013.01); *H04L 12/4633* (2013.01); *H04L 12/4641* (2013.01); *H04L 45/38* (2013.01); *H04L 49/3009* (2013.01)

(58) Field of Classification Search
CPC . H04L 45/74; H04L 12/4633; H04L 12/4641; H04L 45/38; H04L 49/3009;
(Continued)

(56) References Cited

U.S. PATENT DOCUMENTS 9,270,592 B1 * 2/2016 Sites ..................... H04L 45/745
2005/0041660 A1 * 2/2005 Pennec .................. H04L 69/04
370/389

(Continued)

FOREIGN PATENT DOCUMENTS

CN 103354522 A 10/2013
CN 104205080 A 12/2014
(Continued)

OTHER PUBLICATIONS

Antonio F. et al., "OVS-DPDK Datapath Classifier," Intel® Software, Retrieved from the internet: URL <https://software.intel.com/en-us/articles/ovs-dpdk-datapath-classifier,> published on Oct. 28, 2016, 14 pages.

(Continued)

*Primary Examiner* — Peter P Chau
(74) *Attorney, Agent, or Firm* — Fish & Richardson P.C.

(57) ABSTRACT

This application discloses a method and an apparatus for forwarding a packet based on an integrated flow table. The integrated flow table includes a plurality of flow entries, each of the plurality of flow entries includes a mapping relationship between a match item and an operation set, the match item includes a plurality of packet header fields, and the method includes: obtaining a first packet; extracting a plurality of first packet header fields from a packet header of the first packet; searching the integrated flow table for a target flow entry matching the plurality of first packet header fields, to determine an operation set corresponding to the first packet; and performing the other operations in the operation set on the first packet, to obtain a second packet corresponding to the first packet, and forwarding the second packet.

18 Claims, 12 Drawing Sheets

(51) Int. Cl.
  *H04L 45/00* (2022.01)
  *H04L 49/00* (2022.01)
(58) Field of Classification Search
  CPC . H04L 49/70; H04L 45/54; H04L 2012/4629; H04L 45/741
  See application file for complete search history.

(56) References Cited

U.S. PATENT DOCUMENTS

| | | |
|---|---|---|
| 2013/0254766 A1 | 9/2013 | Zuo et al. |
| 2015/0081833 A1* | 3/2015 | Pettit .................. H04L 67/2842 709/213 |
| 2015/0281098 A1* | 10/2015 | Pettit ...................... H04L 45/64 370/235 |
| 2015/0281125 A1* | 10/2015 | Koponen ............... G06F 12/128 711/122 |
| 2016/0080532 A1* | 3/2016 | Zheng .................. H04L 65/607 370/474 |
| 2016/0094460 A1* | 3/2016 | Shelar ................... H04L 45/56 370/392 |
| 2016/0112371 A1* | 4/2016 | Zhou .................. H04L 61/2015 709/245 |
| 2016/0218973 A1 | 7/2016 | Anand |
| 2017/0063690 A1 | 3/2017 | Bosshart |
| 2018/0083876 A1* | 3/2018 | Sharma .................. H04L 45/54 |
| 2018/0219770 A1 | 8/2018 | Wu et al. |
| 2019/0075041 A1 | 3/2019 | Wang et al. |
| 2019/0229977 A1* | 7/2019 | Bisht .................. H04L 47/2483 |
| 2020/0382421 A1* | 12/2020 | K. ....................... H04L 43/026 |

FOREIGN PATENT DOCUMENTS

| | | |
|---|---|---|
| CN | 104348716 A | 2/2015 |
| CN | 104394080 A | 3/2015 |
| CN | 104394083 A | 3/2015 |
| CN | 104426768 A | 3/2015 |
| CN | 104518969 A | 4/2015 |
| CN | 104601468 A | 5/2015 |
| CN | 105224692 A | 1/2016 |
| CN | 105959217 A | 9/2016 |
| CN | 106506402 A | 3/2017 |
| CN | 106936777 A | 7/2017 |
| CN | 106961363 A | 7/2017 |
| CN | 107204867 A | 9/2017 |
| KR | 20150135041 A | 12/2015 |
| WO | 2016045056 A1 | 3/2016 |
| WO | 2018023499 A1 | 2/2018 |

OTHER PUBLICATIONS

Firestone et al., "Azure Accelerated Networking: SmartNICs in the Public Cloud," 15th (USENIX) Symposium on Networked Systems Design and Implementation (NSDI '18), Apr. 9-11, 2018, 14 pages.
PCT International Search Report and Written Opinion issued in International Application No. PCT/CN2019/080602 dated Jun. 19, 2019, 12 pages (partial English translation).
Robin G. et al., "Open vSwitch* with DPDK Overview," Intel® Software, Retrieved from the internet: URL<https://software.intel.com/en-us/articles/open-vswitch-with-dpdk-overview,> published on Sep. 27, 2016, 13 pages.
Zhanxu, "OVS-DPDK Datapath Classifier; OVS-DPDK flow table processing method," Zhao Zhanxu's Blog, Retrieved from the internet: URL<http://zhaozhanxu.com/2016/12/16/SDN/OVS/2016-12-16-datapath-classifier/>, Dec. 16, 2016, 43 pages (with English translation).
Office Action issued in Chinese Application No. 201810278226.6 dated Apr. 15, 2020, 15 pages (With English Translation).
Office Action issued in Chinese Application No. 202110306867.X dated Mar. 3, 2022, 15 pages (with English translation).
Tao, "The Analysis and Implementation of OpenFlow Virtual Switch," May 2016, 2 pages (with English abstract).
Office Action issued in Chinese Application No. 202110306867.X dated Sep. 5, 2022, 2 pages.

* cited by examiner

METHOD AND APPARATUS FOR FORWARDING PACKET BASED ON INTEGRATED FLOW TABLE

CROSS-REFERENCE TO RELATED APPLICATIONS

This application is a continuation application of International Application No. PCT/CN2019/080602, filed on Mar. 29, 2019, which claims priority to Chinese Patent Application No. 201810278226.6, filed on Mar. 31, 2018. The disclosures of the aforementioned applications are hereby incorporated by reference in their entireties.

TECHNICAL FIELD

This application relates to the communications field, and in particular, to a method and an apparatus for forwarding a packet based on an integrated flow table.

BACKGROUND

An open virtual switch (OVS) is configured to forward a packet, and may forward a packet of a virtual machine to a network or an entity machine, or forward a packet from a network or an entity machine to a virtual machine.

After receiving the packet, the OVS needs to obtain a plurality of processing operations of processing the packet. The plurality of processing operations include a forwarding operation of forwarding the packet and at least one other operation performed before the forwarding operation. Then, the OVS processes the packet based on the at least one other operation, and then forwards the processed packet.

Because the OVS can obtain only one processing operation each time, after receiving the packet, the OVS needs to search a plurality of tables, and obtain corresponding processing operations through a plurality of times of searching by using different mapping relationships in the tables, to obtain a plurality of processing operations. Consequently, it needs to take a relatively long time to obtain all operations, which is time-consuming, and packet processing efficiency is low.

SUMMARY

To improve packet processing efficiency, embodiments of this application provide a method and an apparatus for forwarding a packet based on an integrated flow table. The technical solutions are as follows:

According to a first aspect, this application provides a method for forwarding a packet based on an integrated flow table, where the integrated flow table includes a plurality of flow entries, each of the plurality of flow entries includes a mapping relationship between a match item and an operation set, the match item includes a plurality of packet header fields, the operation set includes a forwarding operation. In this way, when a first packet is obtained, a plurality of first packet header fields are extracted from a packet header of the first packet, where the plurality of first packet header fields have same categories as a plurality of packet header fields included in one of the plurality of flow entries; the integrated flow table is searched for a target flow entry matching the plurality of first packet header fields, to determine an operation set corresponding to the first packet, where the operation set corresponding to the first packet further includes all other operations performed on the first packet between the operation of determining an operation set corresponding to the first packet and the forwarding operation; and all the other operations in the operation set are performed on the first packet, to obtain a second packet corresponding to the first packet, and the second packet is forwarded. Because the target flow entry of the integrated flow table includes the operation set corresponding to the first packet, and the operation set includes all operations of processing the first packet, all the operations corresponding to the first packet can be found by searching the integrated flow table based on the plurality of first packet header fields once, thereby improving efficiency of processing and forwarding the first packet.

An operation of determining the operation set corresponding to the first packet may be an operation of reading the operation set corresponding to the first packet, or another operation used to prepare a processing circuit of an apparatus for forwarding a packet based on an integrated flow table to perform an operation in the operation set corresponding to the first packet. In other words, the operations included in the operation set corresponding to the first packet are operations for a field of the first packet (for example, the packet header, a payload, or fields in a packet header and a payload). Therefore, information in the first packet can be forwarded without assistance of another flow table. In an implementation, the operation set corresponding to the first packet further includes all other operations performed on the field of the first packet between the operation of reading the operation set corresponding to the first packet and the forwarding operation, namely, operations performed after the operation set corresponding to the first packet is read and before the forwarding operation is performed.

In a possible implementation of the first aspect, a category of a field in the packet header is a type of information corresponding to the field or a location of the field in the packet header of the first packet.

In a possible implementation of the first aspect, an AND operation is performed on the packet header of the first packet and one mask, to obtain the plurality of first packet header fields of the first packet, where the mask indicates locations of the plurality of first packet header fields in the packet header of the first packet. In this way, all first packet header fields needing to be extracted can be extracted from the packet header of the first packet by performing the AND operation on one mask and the packet header of the first packet, so that compared with a current case of parsing out packet header fields in the packet header of the first packet one by one, parsing efficiency can be improved, and efficiency of processing and forwarding the first packet can be improved.

In a possible implementation of the first aspect, a first mask is generated. Because the first mask and the packet header of the first packet have a same byte length, non-zero bits in the first mask correspond to the plurality of packet header fields included in the target flow entry. In this way, the packet header of the first packet may be parsed by using the first mask, thereby improving efficiency of parsing the first packet.

In a possible implementation of the first aspect, the plurality of flow entries are located in a plurality of rows of the integrated flow table, each of the plurality of rows of the integrated flow table corresponds to one expiration time, the expiration time is used to indicate a moment of deleting a flow entry in the row corresponding to the expiration time from the integrated flow table, and the target flow entry is located in a row corresponding to a first expiration time. In this way, after the integrated flow table is searched for the target flow entry matching the plurality of first packet header fields, to determine the operation set corresponding to the first packet, the target flow entry is moved from the row corresponding to the first expiration time to a row corresponding to a second expiration time, where the second expiration time is later than the first expiration time. In this way, flow entries may be classified based on expiration times, thereby improving searching efficiency during searching for an expired flow entry based on a current time.

In a possible implementation of the first aspect, the first expiration time is updated to the second expiration time. Because the second expiration time is later than the first expiration time, after the target flow entry including the operation set corresponding to the first packet is found in the integrated flow table, duration that the target flow entry is stored in the integrated flow table can be extended.

In a possible implementation of the first aspect, the target flow entry corresponding to the first packet further includes a time difference between the second expiration time and the first expiration time.

In a possible implementation of the first aspect, a third packet is obtained; a plurality of second packet header fields are extracted from a packet header of the third packet, where the plurality of second packet header fields have same categories as the plurality of packet header fields included in one of the plurality of flow entries; when the integrated flow table does not include a target flow entry matching the plurality of second packet header fields, at least one operation corresponding to the third packet is obtained from an open virtual switch OVS, where the at least one operation includes a forwarding operation; and the at least one operation is performed on the third packet. In this way, when the integrated flow table does not include an operation set corresponding to the third packet, the at least one operation corresponding to the third packet can be obtained from the OVS, thereby ensuring that the third packet can be successfully processed and forwarded.

In a possible implementation of the first aspect, the plurality of second packet header fields in the packet header of the third packet and the at least one operation are obtained from the OVS, and a flow entry including the obtained plurality of second packet header fields and the obtained at least one operation is stored in the integrated flow table. In this way, when the third packet is received subsequently, the operation set corresponding to the third packet can be found in the integrated flow table once, thereby improving efficiency of subsequently processing and forwarding a packet having a plurality of second packet header fields the same as those in the third packet.

In a possible implementation of the first aspect, all the other operations include one or more of the following operations: an operation of adding a field to a packet header, an operation of deleting a field from a packet header, an operation of modifying content of a field in a packet header, an operation of setting a priority of a packet, and an operation of setting connection tracking.

According to a second aspect, this application provides an apparatus for forwarding a packet based on an integrated flow table, where the integrated flow table includes a plurality of flow entries, each of the plurality of flow entries includes a mapping relationship between a match item and an operation set, the match item includes a plurality of packet header fields, the operation set includes a forwarding operation, and the apparatus includes a processing module and a transceiver module. The processing module is configured to: obtain a first packet; extract a plurality of first packet header fields from a packet header of the first packet, where the plurality of first packet header fields have same categories as a plurality of packet header fields included in one of the plurality of flow entries; search the integrated flow table for a target flow entry matching the plurality of first packet header fields, to determine an operation set corresponding to the first packet, where the operation set corresponding to the first packet further includes all other operations performed on the first packet between the operation of determining an operation set corresponding to the first packet and the forwarding operation; and perform all the other operations in the operation set on the first packet, to obtain a second packet corresponding to the first packet. The transceiver module is configured to forward the second packet. Because the target flow entry of the integrated flow table includes the operation set corresponding to the first packet, and the operation set includes all operations of processing the first packet, all the operations corresponding to the first packet can be found by searching the integrated flow table based on the plurality of first packet header fields once, thereby improving efficiency of processing and forwarding the first packet.

In a possible implementation of the second aspect, the processing module and the transceiver module in the apparatus may further be configured to perform the method in any possible implementation of the first aspect. For explanations of terms and sentences in the second aspect that correspond to the first aspect, and descriptions of beneficial effects of various implementations, refer to the first aspect.

According to a third aspect, this application provides an apparatus for forwarding a packet based on an integrated flow table, where the integrated flow table includes a plurality of flow entries, each of the plurality of flow entries includes a mapping relationship between a match item and an operation set, the match item includes a plurality of packet header fields, the operation set includes a forwarding operation, and the apparatus includes a processing module and a transceiver module. The processing module is configured to: obtain a first packet; extract a plurality of first packet header fields from a packet header of the first packet, where the plurality of first packet header fields have same categories as a plurality of packet header fields included in one of the plurality of flow entries; search the integrated flow table based on the plurality of first packet header fields, and when a target flow entry matching the plurality of first packet header fields is found, determine, based on the target flow entry, an operation set corresponding to the first packet, where the operation set corresponding to the first packet further includes all other operations performed on the first packet between the operation of determining an operation set corresponding to the first packet and the forwarding operation, and perform all the other operations in the operation set on the first packet; or when the target flow entry matching the plurality of first packet header fields is not found, obtain at least one operation corresponding to the first packet from an open virtual switch OVS, where the at least one operation includes a forwarding operation, and perform the at least one operation on the first packet. The transceiver module is configured to forward the processed first packet. Because the target flow entry of the integrated flow table includes the operation set corresponding to the first packet, and the operation set includes all operations of processing the first packet, when the integrated flow table includes the target flow entry, all the operations corresponding to the first packet can be found by searching the integrated flow table based on the plurality of first packet header fields once, thereby improving efficiency of processing and forwarding the first packet. When the integrated flow table does not include the target flow entry, the at least one operation corresponding to the first packet can be obtained from the OVS, thereby ensuring that the first packet can be successfully processed and forwarded.

In a possible implementation of the third aspect, the processing module and the transceiver module in the apparatus may further be configured to perform the method in any possible implementation of the first aspect. For explanations of terms and sentences in the third aspect that correspond to the first aspect, and descriptions of beneficial effects of various implementations, refer to the first aspect.

According to a fourth aspect, this application provides an apparatus for forwarding a packet based on an integrated flow table. The apparatus includes a processing circuit and a storage medium, where the storage medium stores one or more programs, the one or more programs are configured to be executed by the processing circuit, and the one or more programs include an instruction used to perform the method in the first aspect or any possible implementation of the first aspect. For explanations of terms and sentences in the fourth aspect that correspond to the first aspect, and descriptions of beneficial effects of various implementations, refer to the first aspect.

According to a fifth aspect, this application provides an apparatus for forwarding a packet based on an integrated flow table. The apparatus includes a communications interface, a processing circuit, and a storage medium. The processing circuit is connected to both the communications interface and the storage medium. The storage medium is configured to store a program, an instruction, or code, and the processing circuit is configured to execute the program, the instruction, or the code in the storage medium, to implement the method in the first aspect or any possible implementation of the first aspect.

According to a sixth aspect, an embodiment of this application provides a computer program product. The computer program product includes a computer program stored in a computer readable storage medium, and the computer program is loaded by a processor to implement the method in the first aspect or any possible implementation of the first aspect.

According to a seventh aspect, an embodiment of this application provides a non-volatile computer readable storage medium, configured to store a computer program. The computer program is loaded by a processor to execute an instruction of the method in the first aspect or any possible implementation of the first aspect.

According to an eighth aspect, an embodiment of this application provides a chip, and the chip includes a programmable logic circuit and/or a program instruction. When the chip runs, the method in the first aspect or any possible implementation of the first aspect is implemented.

For explanations of terms and sentences in the second aspect, the third aspect, the fourth aspect, the fifth aspect, the sixth aspect, the seventh aspect, and the eighth aspect that correspond to the first aspect, and descriptions of beneficial effects of various implementations, refer to the first aspect, and details are not described herein again.

BRIEF DESCRIPTION OF DRAWINGS

FIG. 1-2 is a schematic architectural diagram of a system according to an embodiment of this application;

FIG. 1-3 is a schematic diagram of a virtual network system using an OVS;

FIG. 1-4 is a schematic structural diagram of a packet according to an embodiment of this application;

FIG. 2-1 is a flowchart of a method for forwarding a packet based on an integrated flow table according to an embodiment of this application;

FIG. 2-2 is a schematic structural diagram of a flow entry according to an embodiment of this application;

FIG. 2-3 is a schematic structural diagram of another flow entry according to an embodiment of this application;

FIG. 2-4 is a schematic structural diagram of a packet header and a mask according to an embodiment of this application;

FIG. 2-5 is a schematic diagram of a process of an AND operation performed on a first packet and a plurality of masks according to an embodiment of this application:

FIG. 2-6 is a schematic diagram of a process of an AND operation performed on a first packet header and a mask according to an embodiment of this application:

FIG. 2-7 is a flowchart of packet parallel parsing according to an embodiment of this application;

FIG. 2-8 is a schematic structural diagram of rows of an integrated flow table according to an embodiment of this application:

FIG. 2-9 is a schematic structural diagram of storing rows of an integrated flow table by using linked lists according to an embodiment of this application;

FIG. 2-10 is a flowchart of monitoring an integrated flow table according to an embodiment of this application;

FIG. 3-1 is a flowchart of another method for forwarding a packet based on an integrated flow table according to an embodiment of this application:

FIG. 3-2 is a schematic structural diagram of an OVS according to an embodiment of this application;

FIG. 3-3 is a schematic diagram of processing a packet by an OVS according to an embodiment of this application:

FIG. 3-4 is a brief block diagram of packet forwarding according to an embodiment of this application;

FIG. 4-1 is a schematic structural diagram of an apparatus for forwarding a packet according to an embodiment of this application;

FIG. 4-2 is a structural block diagram of an apparatus for forwarding a packet and an OVS according to an embodiment of this application;

FIG. 4-3 is a structural block diagram of integration of a packet forwarding apparatus and an OVS according to an embodiment of this application; and FIG. 5 is a schematic structural diagram of an apparatus for forwarding a packet based on an integrated flow table according to an embodiment of this application.

DESCRIPTION OF EMBODIMENTS

The following further describes the embodiments of this application in detail with reference to the accompanying drawings.

Figure 1:
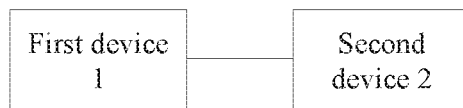
FIG. 1-1 is a schematic architectural diagram of a system according to an embodiment of this application.

Referring to FIG. 1-1, an embodiment of this application provides a system architecture, including:

a first device 1 and a second device 2, where a network connection may be established between the first device 1 and the second device 2.

The first device 1 may be a terminal, a server, or the like. The first device 1 may include at least one virtual machine. The second device 2 may be a terminal, a server, or the like.

The first device 1 may send a packet to the second device 2. The packet may come from a virtual machine in the first device 1. Optionally, during implementation, the first device 1 may obtain a first packet of a virtual machine included in the first device 1; obtain operations used to process the first packet, where the obtained operations include a forwarding operation and at least one other operation performed before the forwarding operation; perform the at least one other operation on the first packet, to obtain a second packet corresponding to the first packet; and forward the second packet to the second device 2.

The second device 2 may also send a packet to a virtual machine in the first device 1. Optionally, the first device 1 receives a first packet from the second device 2; obtains operations used to process the first packet, where the obtained operations include a forwarding operation and at least one other operation performed before the forwarding operation; performs the at least one other operation on the first packet, to obtain a second packet corresponding to the first packet; and inputs the second packet to the virtual machine.

Figures 1, 2:
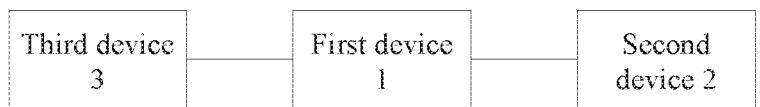

Optionally, the first device 1 may be a switching device such as a router or a switch. Referring to FIG. 1-2, the system may further include a third device 3, and a network connection may also be established between the first device 1 and the third device 3. The first device 1 may forward a packet between the second device 2 and the third device 3.

For example, the first device 1 may receive the first packet from the second device 2; obtain operations used to process the first packet, where the obtained operations include a forwarding operation and all other operations performed on the first packet before the forwarding operation; perform all the other operations on the first packet, to obtain a second packet; and forward the second packet to the third device 3.

Optionally, the second device 2 may be a terminal, and the third device 3 may be a server; or the second device 2 may be a server, and the third device 3 may be a terminal; or both the second device 2 and the third device 3 may be terminals or servers.

Optionally, the first device 1 may forward the second packet based on receive end information in a packet header of the second packet. The receive end information may include a receive end address, and may further include information such as a receive end port number.

If a receive end corresponding to the receive end information is a virtual machine, the first device 1 inputs the second packet to the virtual machine; if a receive end corresponding to the receive end information is the second device 2, the first device 1 forwards the second packet to the second device 2; or if a receive end corresponding to the receive end information is the third device 3, the first device forwards the second packet to the third device 3.

The foregoing packet (which may be the first packet and/or the second packet) includes a packet header and packet content (which is also referred to as a payload), and the packet header includes a plurality of packet header fields. In other words, the packet header fields are fields forming the packet header. The following describes the packet header and the packet header field by using an example of a packet. For example, the packet header usually includes fields such as a source address, a source port number, a destination address, and a destination port number, and the fields are packet header fields.

Any one of the first device, the second device, and the third device may include an apparatus configured to implement the method in the embodiments of this application. The apparatus may perform operations in the steps of the method in the embodiments, to implement packet forwarding. Because an OVS is also used for packet forwarding, it may be considered that the apparatus has a function of the OVS.

For any one of the foregoing devices, the device may further include an OVS. In other words, the device may be integrated with the OVS. The device communicates with the OVS, and may cooperate with the OVS, to implement packet forwarding.

Alternatively, the OVS is one part of the device. For example, the OVS may be one of modules forming the device.

Alternatively, the first device may not include an OVS. The OVS is located in a device other than the first device. The apparatus communicates with the another device, and may cooperate with the OVS in the another device, to implement packet forwarding.

In this embodiment, a packet header of the first packet includes a plurality of first packet header fields. The plurality of first packet header fields have same categories as a plurality of packet header fields included in one flow entry in an integrated flow table.

Figures 1, 2, 3:
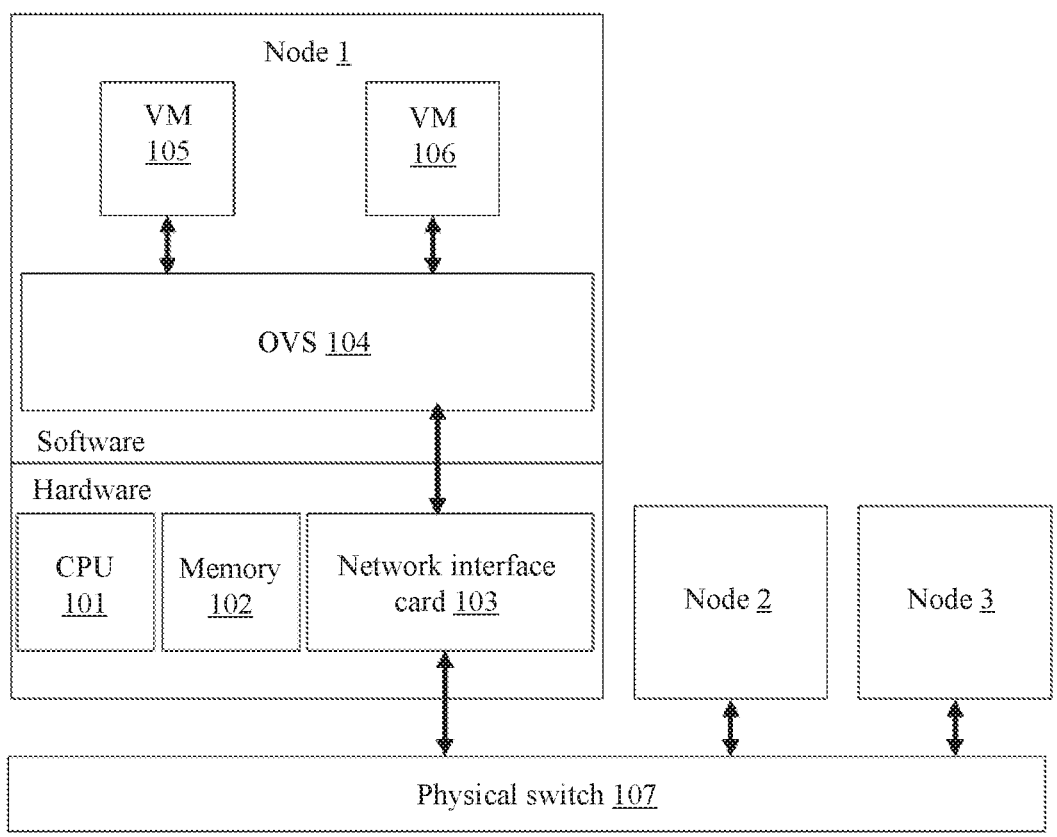

FIG. 1-3 is a schematic diagram of a virtual network system using an OVS. For example, a node 1, a node 2, and a node 3 in the architectural diagram may correspond to the first device, the second device, and the third device in an implementation described above.

The node 1, the node 2, and the node 3 are three physical hosts or servers in which OVS software is installed and in which a network interface card (NIC) is configured. The three nodes transmit information by using a physical switch 107. Each node has complete software and hardware. For brevity, FIG. 1-3 merely shows an example of software and hardware included in the node 1.

As shown in FIG. 1-3 the hardware of the node 1 includes a central processing unit 101 (CPU), a memory 102, and a network interface card 103. The software of the node 1 includes an OVS 104, a virtual machine (VM) 105, and a VM 106. The VM 105 and the VM 106 in the node 1 communicate with another node by using the OVS 104 and the network interface card 103. The apparatus for forwarding a packet based on an integrated flow table in this application may be located in the OVS 104 as software; or may be independent of the OVS 104, for example, may be represented by using a block between the virtual machines (the VM 105 and the VM 106) and the OVS 104 shown in the figure. A packet is first forwarded by using the apparatus, and if the packet cannot be forwarded by using an integrated flow table in the apparatus, the packet is forwarded by using the OVS. The method in this application may be performed by using a hardware resource of the CPU 101, or may be performed by using a hardware resource of the network interface card 103. The virtual network system is merely an example description, and a virtual network system applicable to this application is not limited thereto. For example, a container or other virtual operating system software may further be installed in the node 1, there may be another quantity of nodes, and hardware included in each node is not limited to the hardware shown in FIG. 1-3.

For example, FIG. 1-4 shows a structure of a virtual extensible local area network (Virtual Extensible LAN, VXLAN) packet including a packet header, packet content, and a frame check sequence (FCS). The packet header includes an outer media access control (MAC) header, an outer Internet Protocol (IP), header, a User Datagram Protocol (UDP), header, and a VXLAN header.

Still referring to FIG. 1-4, packet header fields included in the outer MAC header are respectively a destination MAC address, a source MAC address, a virtual local area network (VLAN) type, a VLAN identifier tag (VLAN ID Tag), and an ethernet type Packet header fields included in the outer IP header are respectively IP header misc data, a protocol, header checksum, an outer source IP address, and an outer destination IP address. Packet header fields included in the UPD header are respectively a UDP source port, a VXLAN port, a UDP length, and checksum. Packet header fields included in the VXLAN header are respectively a VXLAN, a virtual local area network identifier (Virtual LAN Identify, VNID), and two reserved fields.

In this embodiment, for a detailed process in which the first device 1 processes the first packet, and forwards the second packet obtained after the processing, refer to an implementation process of any embodiment below, and details are not described herein.

Referring to FIG. 2-1, an embodiment of this application provides a method for forwarding a packet based on an integrated flow table. The method may be performed by the first device in the embodiment shown in FIG. 1-1 or FIG. 1-2, and includes the following steps.

Step 201: Obtain a first packet.

The first packet may be a packet from a virtual machine, or may be a packet sent by a physical device other than the first device. The virtual machine may run in the first device, or the virtual machine may run in a physical device other than the first device.

For example, when the first device is a network element such as a router or a switch in a network, the first device may receive the first packet sent by a terminal, a server, or another network element in the network.

Alternatively, when the first device is a server, the first device may receive the first packet sent by a device such as a terminal or another server, or the first device may include at least one virtual machine, and the first device may obtain the first packet from a virtual machine.

Alternatively, when the first device is a terminal, the first device may receive the first packet sent by a device such as another terminal or a server, or the first device may include at least one virtual machine, and the first device may obtain the first packet from a virtual machine.

The integrated flow table includes a plurality of flow entries, each of the plurality of flow entries includes a mapping relationship between a match item and an operation set. For a match item and an operation set that are included in each flow entry, the match item includes a plurality of packet header fields, and the operation set includes a forwarding operation and all other operations performed, before the forwarding operation, on a packet corresponding to the operation set.

An operation of determining an operation set corresponding to the first packet may be an operation of reading the operation set corresponding to the first packet, or another operation used to prepare a processing circuit of an apparatus for forwarding a packet based on an integrated flow table to perform an operation in the operation set corresponding to the first packet. In other words, the operations included in the operation set corresponding to the first packet are operations for a field of the first packet (for example, a packet header, a payload, or fields in a packet header and a payload). Therefore, information in the first packet can be forwarded without assistance of another flow table. In an implementation, the operation set corresponding to the first packet further includes all other operations performed on the field of the first packet between the operation of reading the operation set corresponding to the first packet and the forwarding operation, namely, operations performed after the operation set corresponding to the first packet is read and before the forwarding operation is performed.

Categories included in all the other operations include one or more of the following: an operation of adding a field to a packet header, an operation of deleting a field from a packet header, an operation of modifying content of a field in a packet header, an operation of setting a priority of a packet, and an operation of setting connection tracking. In an implementation, the categories of all the other operations include only one or several categories of the foregoing five operations, and operations of other categories are not "all the other operations" described in this application. Optionally, a category of a field in the packet header of the first packet is a type of information corresponding to the field or a location of the field in the packet header of the first packet.

In this step, it is assumed that the packet header of the first packet includes a plurality of first packet header fields that are the same as a plurality of packet header fields included in one match item in the integrated flow table. Therefore, the integrated flow table includes the operation set corresponding to the first packet.

Optionally, for the match item in each flow entry of the integrated flow table, the match item in the flow entry may uniquely identify one packet flow.

Categories of packet header fields included in match items in the flow entries of the integrated flow table may be the same. In other words, for any two flow entries of the integrated flow table, categories of fields included in match items in the two flow entries are the same. In this way, in this embodiment, each packet flow is uniquely identified by using packet header fields of same categories.

Alternatively, categories of packet header fields included in match items in the flow entries of the integrated flow table may be different. In other words, for any two flow entries of the integrated flow table, categories of fields included in match items in the two flow entries may be different.

Some packet flows need to be uniquely identified by using 9-tuple fields in a packet header of a packet, and some packet flows may be uniquely identified by using only 5-tuple fields in a packet header of a packet, or some packet flows may be uniquely identified by using only 4-tuple fields in a packet header of a packet. Therefore, the categories of the packet header fields included in the match items in the flow entries of the integrated flow table may be different.

Optionally, a match item in a flow entry may include 9-tuple fields in a packet header, some packet header fields in the 9-tuple fields, or the like.

Optionally, the match item includes the 9-tuple fields in the packet header. In other words, the match item includes nine packet header fields, and the nine packet header fields may be respectively a transmit end address, a transmit end port number, a receive end address, a receive end port number, a VXLAN, a protocol, an outer virtual local area network (OUTER VLAN), an inner virtual local area network (INNER VLAN), and a virtual port (vPort).

Optionally, the match item may alternatively include some of the nine packet header fields. For example, the match item may include a transmit end address, a transmit end port number, a receive end address, and a receive end port number. For another example, the match item may include a transmit end address, a transmit end port number, a receive end address, a receive end port number, and a protocol.

Optionally, the transmit end address may be a transmit end IP address, and the receive end address may be a receive end IP address.

Optionally, for the nine packet header fields, the transmit end address may occupy four bytes, the transmit end port number may occupy two bytes, the receive end address may occupy four bytes, the receive end port number may occupy two bytes, the VXLAN may occupy three bytes, the protocol may occupy one byte, and the OUTER VLAN, the INNER VLAN, and the vPort each may occupy two bytes.

For each flow entry of the integrated flow table, the operation set in the flow entry includes the forwarding operation and at least one other operation performed before the forwarding operation.

Optionally, the other operation may be any one of the following operations: an operation of adding a field to a packet header, an operation of deleting a field from a packet header, an operation of modifying content of a field in a packet header, an operation of setting a priority of a packet, and an operation of setting connection tracking. For the another operation, this embodiment lists only the foregoing several operations, and others are not listed herein.

Optionally, the operation of adding a field to a packet header may include at least one of an operation of adding a VLAN field to the packet header and an operation of adding a VXLAN field to the packet header. The operation of deleting a field from a packet header may include at least one of an operation of deleting a VLAN field from the packet header and an operation of deleting a VXLAN field from the packet header.

The operation of modifying content of a field in a packet header may include at least one of an operation of modifying a transmit end MAC address in the packet header, an operation of modifying a receive end MAC address in the packet header, an operation of modifying a transmit end IP address in the packet header, an operation modifying a receive end IP address in the packet header, an operation of modifying a transmit end port number in the packet header, and an operation of modifying a receive end port number in the packet header.

Optionally, the operation of setting connection tracking may be an operation of recording status information of a packet. The status information of the packet may include information such as a sequence number of the packet.

The operation of recording the status information of the packet may be: extracting, from a packet header of the packet, identifier information used to identify the packet and obtaining the status information of the packet, where the identifier information may include at least one of a transmit end address, a transmit end port number, a receive end address, and a receive end port number of the packet; and storing the identifier information and the status information in a correspondence between identifier information and status information.

Optionally, referring to FIG. 2-2, for each flow entry of the integrated flow table, the flow entry may directly store the operation set including a plurality of operations.

The operation set in the flow entry may include a field corresponding to each of the plurality of operations, and the field corresponding to the operation includes a name of the operation, a parameter size of the operation, and a parameter of the operation. In this way, during reading an operation from a first mapping relationship subsequently, a name of the operation and a parameter size of the operation are first read from a field corresponding to the operation, and a parameter of the operation is read based on the parameter size of the operation, to obtain the operation.

For example, referring to FIG. 2-2, the operation set in the flow entry includes fields corresponding to each of k+1 operations: a field corresponding to the first operation includes a name $cmd_0$ of the operation, a parameter size $size_0$ of the operation, and a parameter $config_0$ of the operation; a field corresponding to the second operation includes a name $cmd_1$ of the operation, a parameter size $size_1$ of the operation, and a parameter $config_1$ of the operation, . . . ; and a field corresponding to the $(k+1)^{th}$ operation includes a name $cmd_k$ of the operation, a parameter size $size_k$ of the operation, and a parameter $config_k$ of the operation.

Optionally, referring to FIG. 2-3, the flow entry may alternatively store a pointer directed to the operation set instead of directly storing the operation set including the plurality of operations. Each of the plurality of operations in the operation set corresponds to a field, and the field corresponding to the operation includes a name of the operation, a parameter size of the operation, and a parameter of the operation. For example, referring to FIG. 2-3, the flow entry includes a action pointer, an operation set to which the pointer action pointer is directed includes fields corresponding to each of k+1 operations: a field corresponding to the first operation includes a name $cmd_0$ of the operation, a parameter size $size_0$ of the operation, and a parameter $config_0$ of the operation; a field corresponding to the second operation includes a name $cmd_1$ of the operation, a parameter size $size_1$ of the operation, and a parameter $config_1$ of the operation, . . . ; and a field corresponding to a $(k+1)^{th}$ operation includes a name $cmd_k$ of the operation, a parameter size $size_k$ of the operation, and a parameter $config_k$ of the operation.

Optionally, for the operation of adding a vlan to a packet header, a parameter of the operation includes at least field content of the to-be-added vlan.

For the operation of adding a vxlan to a packet header, a parameter of the operation includes at least field content of the to-be-added vxlan.

For the operation of deleting a vlan from a packet header, a parameter of the operation includes at least a field identifier used to identify the vlan needing to be deleted.

For the operation of deleting a vxlan from a packet header, a parameter of the operation includes at least a field identifier used to identify the vxlan needing to be deleted.

For the operation of modifying a transmit end MAC address in a packet header, a parameter of the operation includes at least a modified transmit end MAC address.

For the operation of modifying a receive end MAC address in a packet header, a parameter of the operation includes at least a modified receive end MAC address.

For the operation of modifying a transmit end IP address in a packet header, a parameter of the operation includes at least a modified transmit end IP address.

For the operation of modifying a receive end IP address in a packet header, a parameter of the operation includes at least a modified receive end IP address.

For the operation of modifying a transmit end port number in a packet header, a parameter of the operation includes at least a modified transmit end port number.

For the operation of modifying a receive end port number in a packet header, a parameter of the operation includes at least a modified receive end port number.

For the operation of setting a priority of a packet, a parameter of the operation includes at least the priority.

For the operation of setting connection tracking, a parameter of the operation includes at least indication information used to instruct to record status information of a packet.

Optionally, referring to FIG. 2-2, for each flow entry of the integrated flow table, the flow entry may further include other information in addition to a match item and an operation set. For example, the flow entry may further include packet statistics information, and the packet statistics information may include a packet quantity and/or a packet data amount. The packet quantity is used to record a total quantity of packets forwarded by using the flow entry, and the packet data amount is used to record a total data amount of a packet forwarded by using the flow entry.

Each flow entry of the integrated flow table may be set by a person skilled in the art or generated in a packet forwarding process. For a detailed process of generating the flow entry in the packet forwarding process, refer to the embodiment described in FIG. 3-1, and details are not described herein.

Step 202: Extract a plurality of first packet header fields from a packet header of the first packet.

The extracted plurality of first packet header fields have same categories as the plurality of packet header fields included in one flow entry of the integrated flow table.

In this step, an AND operation may be performed on the packet header of the first packet and one mask, to obtain the plurality of first packet header fields of the first packet. The mask indicates locations of the plurality of first packet header fields in the packet header of the first packet.

Optionally, before this step is performed, one first mask may be generated. The first mask and the packet header of the first packet have a same byte length, the first mask corresponds to at least one target flow entry of the integrated flow table, and non-zero bits in the first mask correspond to a plurality of packet header fields included in the target flow entry. Then, an AND operation may be performed on the packet header of the first packet and the first mask, to obtain the plurality of first packet header fields of the first packet.

Optionally, the first mask includes a plurality of mask fields, and each packet header field in the packet header of the first packet corresponds to one mask field. For each packet header field in the packet header of the first packet, a length of the packet header field is equal to a length of the mask field corresponding to the packet header field. If a category of the packet header field is a category of one packet header field in the target flow entry, the mask field corresponding to the packet header field consists of bits 1, or if a category of the packet header field is not a category of any packet header field in the target flow entry, the mask field corresponding to the packet header field consists of bits 0.

For example, it is assumed that the target flow entry corresponding to the first mask in the integrated flow table includes 9-tuple fields in the packet header. In other words, the target flow entry includes a transmit end address, a transmit end port number, a receive end address, a receive end port number, a VXLAN, a protocol, an OUTER VLAN, an INNER VLAN, and a vPort.

Figures 1, 2, 3, 4:
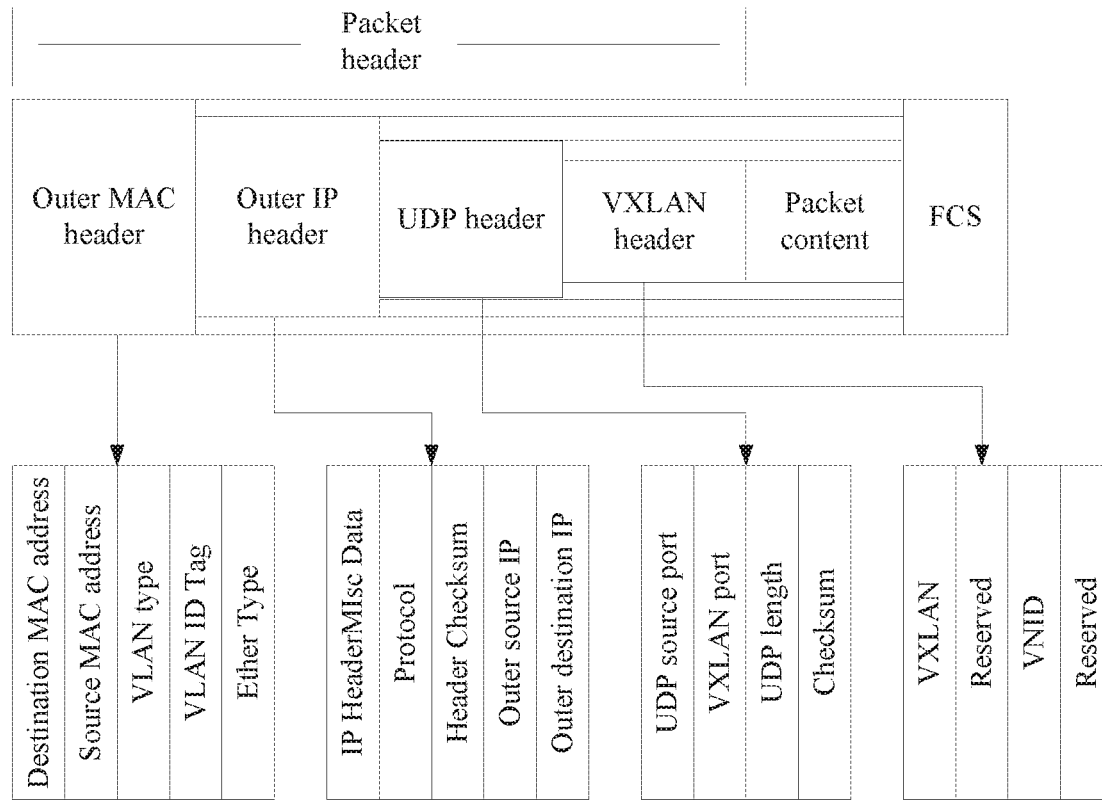

FIG. 2-4 shows packet header fields in the packet header of the first packet, and the packet header of the first packet includes 12 packet header fields: a version, a service type, a transmit end address, a total length, a transmit end port number, a receive end address, a receive end port number, a VXLAN, a protocol, an OUTER VLAN, an INNER VLAN, and a vPort. Similarly, for the generated first mask, the first mask may further include mask fields corresponding to each of the 12 packet header fields.

For the version, the service type, and the total length, none of categories of the three packet header fields is a category of a packet header field in the target flow entry. Therefore, a mask field corresponding to the version consists of bits 0, a mask field corresponding to the service type consists of bits 0, and a mask field corresponding to the total length consists of bits 0.

All categories of the nine packet header fields: the transmit end address, the transmit end port number, the receive end address, the receive end port number, the VXLAN, the protocol, the OUTER VLAN, the INNER VLAN, and the vPort are categories of the packet header fields in the target flow entry. Therefore, a mask field corresponding to the transmit end address consists of bits 1, a mask field corresponding to the transmit end port number consists of bits 1, a mask field corresponding to the receive end address consists of bits 1, a mask field corresponding to the receive end port number consists of bits 1, a mask field corresponding to the VXLAN consists of bits 1, a mask field corresponding to the protocol consists of bits 1, a mask field corresponding to the OUTER VLAN consists of bits 1, a mask field corresponding to the INNER VLAN consists of bits 1, and a mask field corresponding to the vPort consists of bits 1.

Optionally, when the categories of the packet header fields included in the match items in the flow entries of the integrated flow table are the same, only one first mask needs to be generated. An AND operation is performed on the packet header of the first packet and the first mask to obtain a packet header field set including the plurality of first packet header fields.

It is assumed that the packet header of the first packet includes a plurality of first packet header fields that are the same as a plurality of packet header fields included in one match item in the integrated flow table. In other words, the packet header field set that is extracted in this step and that includes the plurality of first packet header fields is the same as one match item in the integrated flow table.

Optionally, when the categories of the packet header fields in the match items in the flow entries of the integrated flow table may be different, a plurality of first masks may be generated. Each first mask corresponds to a target flow entry of the integrated flow table, and categories of packet header fields in target flow entries corresponding to the first masks are different.

For each first mask, an AND operation is performed on the packet header of the first packet and the first mask, to obtain a packet header field set including a plurality of first packet header fields, and the first packet header fields in the packet header field set have same categories as packet header fields in a target flow entry corresponding to the first mask. In this way, N packet header field sets may be extracted from the first packet, N is an integer greater than 1, and categories of packet header fields in the packet header field sets are different.

In this embodiment, it is assumed that one packet header field set in the N packet header field sets is the same as one match item in the integrated flow table.

For example, referring to FIG. 2-5, it is assumed that six first masks may be generated: first masks 1, 2, 3, 4, 5, and 6, and an AND operation is performed on the packet header of the first packet and each of the first masks 1, 2, 3, 4, 5, and 6, to obtain packet header field sets 1, 2, 3, 4, 5, and 6.

At least one packet header field set may be preset. In addition, each match item in the integrated flow table is a preset packet header field set.

Optionally, for each first mask, an AND operation is performed on the packet header of the first packet and the first mask once, to obtain a plurality of packet header fields in the first packet header. If the plurality of packet header fields are one preset packet header field set, the plurality of packet header fields form a packet header field set. If the plurality of packet header fields are different from any one of the at least one preset packet header field set, the plurality of packet header fields are discarded.

Optionally, a control interface may be provided for a user, and the user may preset at least one packet header field set by using the control interface.

In this embodiment, the plurality of first packet header fields needing to be obtained from the first packet header can be obtained by performing a parallel AND operation on the packet header of the first packet and one mask only once, thereby improving efficiency of parsing out fields of the first packet.

For example, referring to FIG. 2-6, an AND operation is performed on the packet header of the first packet and one first mask in FIG. 2-4, and after the OR operation, the plurality of first packet header fields reserved in the packet header of the first packet include nine packet header fields: the transmit end address, the transmit end port number, the receive end address, the receive end port number, the VXLAN, the protocol, the OUTER VLAN, the INNER VLAN, and the vPort. All the nine packet header fields are the first packet header fields needing to be extracted, and the nine packet header fields form a packet header field set.

Step 202 is a parallel parsing operation. Referring to FIG. 2-7, the parallel parsing operation in step 202 generally may be: obtaining the first packet, identifying the packet header of the first packet, capturing the packet header fields in the packet header of the first packet, and performing an AND operation on each of the packet header fields and one mask, to obtain the packet header field set.

Step 203: Search the integrated flow table for a target flow entry matching the plurality of first packet header fields, to determine an operation set corresponding to the first packet.

The operation set corresponding to the first packet further includes all other operations performed on the first packet between the operation of determining an operation set corresponding to the first packet and the forwarding operation.

When the categories of the packet header fields in the match items in the flow entries of the integrated flow table may be the same, because a packet header field set including the plurality of first packet header fields is extracted in step 202, and the packet header field set is the same as one match item in the integrated flow table, in this step, the target flow entry matching the plurality of first packet header fields is found in the integrated flow table based on the plurality of first packet header fields.

When the categories of the packet header fields included in the match items in the flow entries of the integrated flow table may be different, N packet header field sets are extracted in step 202. In addition, because one packet header field set in the N packet header field sets is the same as one match item in the integrated flow table, in this step, the integrated flow table may be searched, by using the following steps (1) to (4), for a target flow entry matching a packet header field set in the plurality of packet header field sets.

(1) Select one packet header field set from the N packet header field sets.

(2) Search the integrated flow table based on the selected packet header field set, and if a target flow entry matching the selected packet header field set is found, perform (3), or if no target flow entry matching the selected packet header field set is found, perform (4).

(3) Determine an operation set included in the target flow entry as the operation set corresponding to the first packet, end the process, and return.

(4) Select, from the N packet header field sets, one packet header field set that is not selected previously, and perform (2).

Because one packet header field set in the N packet header field sets is the same as one match item in the integrated flow table, the operation set corresponding to the first packet can be found based on a packet header field set by using the process of (1) to (4).

Optionally, parameters of a plurality of operations included in the operation set corresponding to the first packet are found in the integrated flow table.

It should be noted that the plurality of operations include the forwarding operation and all the other operations performed on the first packet before the forwarding operation.

Optionally, each flow entry of the integrated flow table may further include an expiration time. The expiration time is used to indicate a moment of deleting the flow entry from the integrated flow table. In this embodiment, the target flow entry matching the plurality of first packet header fields includes a first expiration time.

Optionally, the target flow entry matching the plurality of first packet header fields is found in the integrated flow table, to determine the operation set corresponding to the first packet, and the first expiration time in the target flow entry may be updated to a second expiration time. The second expiration time is later than the first expiration time.

The first expiration time may be extended, to obtain the second expiration time.

Optionally, there are a plurality of implementations of extending the first expiration time to obtain the second expiration time. For example, the following implementation is listed in this embodiment, and is specifically as follows:

The target flow entry further includes a time difference between the second expiration time and the first expiration time, and the first expiration time may be extended by the time difference, to obtain the second expiration time.

Optionally, the flow entries of the integrated flow tables may include a same time difference or different time differences.

For another example, the following manner of obtaining the second expiration time is further listed in this embodiment. In this manner, a time difference may be preset, and each flow entry of the integrated flow table may not include a time difference used to extend an expiration time. In this way, the first expiration time may be extended by the preset time difference, to obtain the second expiration time.

Optionally, for the plurality of flow entries of the integrated flow table, the plurality of flow entries are located in a plurality of rows of the integrated flow table, each of the plurality of rows of the integrated flow table corresponds to one expiration time, and the target flow entry is located in a row corresponding to the first expiration time.

Optionally, after the target flow entry matching the plurality of first packet header fields is found in the integrated flow table, to determine the operation set corresponding to the first packet, the target flow entry may be moved from the row corresponding to the first expiration time to a row corresponding to the second expiration time.

Optionally, each expiration time in the integrated flow table may correspond to one row, and each row may include at least one flow entry. In other words, the second expiration time corresponds to one row, and in this way, each flow entry including the second expiration time may be located in the row corresponding to the second expiration time.

Alternatively, optionally, each expiration time in the integrated flow table may correspond to at least one row, and each row may include one flow entry. In other words, the second expiration time corresponds to at least one row, and each row corresponding to the second expiration time includes one flow entry including the second expiration time.

Optionally, a flow entry in each row of the integrated flow table may be an index used to identify the flow entry, and the index used to identify the flow entry may be a pointer directed to the flow entry, or the like. The foregoing moving operation may be:

moving an index of the target flow entry from the row corresponding to the first expiration time to the row corresponding to the second expiration time.

Optionally, when each expiration time in the integrated flow table may correspond to one row, and each row may include at least one flow entry, a row of the integrated flow table may be implemented by using a linked list, and each row is one linked list. One node in the linked list is used to store an expiration time in the row, and the other node in the linked list is used to store an index of a flow entry in the row.

Optionally, the first node in a linked list may be used to store an expiration time in the row, and the other node in the linked list is used to store an index of a flow entry in the row.

For example, referring to FIG. 2-8, it is assumed that the integrated flow table includes k rows: a first row, a second row, . . . , and a $k^{th}$ row. The first row includes an expiration time $T_1$ and indexes of four flow entries, and the indexes of the four flow entries are respectively $C_0$, $C_1$, $C_2$, and $C_3$. A first node in a linked list corresponding to the first row is used to store the expiration time $T_1$, and the other nodes are used to store $C_0$, $C_1$, $C_2$, and $C_3$. For meanings of the second row, the third row, . . . , and the $k^{th}$ row, refer to descriptions of the meaning of the first row, and details are not described herein again.

Optionally, a row corresponding to a current time may be obtained from the integrated flow table, and a flow entry in the row is deleted from the correspondence. In this way, there is no need to check in real time expiration times in flow entries in the integrated flow table, thereby saving an operation resource.

During deletion, a corresponding flow entry may be found in the integrated flow table based on an index of the flow entry in the row, an expiration time in the flow entry is extracted, and when it is determined through comparison that the expiration time is the current time, the flow entry is deleted from the integrated flow table.

A quantity of linked lists is usually limited. Referring to FIG. 2-9, it is assumed that there are M linked lists, and M is an integer greater than 1. The integrated flow table includes a maximum of M−1 rows, and an expiration time $T_1$ in an $i^{th}$ linked list is later than an expiration time $T_{i-1}$ in an $(i−1)^{th}$ linked list, where i=2, 3, . . . , M−1. An expiration time in an $(M−1)^{th}$ linked list is $T_{M-1}$, and an $M^{th}$ linked list is used to store an index of a flow entry including an expiration time greater than $T_{M-1}$.

Therefore, an operation of moving the target flow entry from the row corresponding to the first expiration time to the row corresponding to the second expiration time may be:

if the second expiration time is not later than the expiration time $T_{M-1}$, moving the index of the target flow entry from a linked list storing the first expiration time to a linked list storing the second expiration time; or if the second expiration time is later than the expiration time $T_{M-1}$, moving the index of the target flow entry to the $M^{th}$ linked list.

Optionally, when the expiration time $T_{M-1}$ arrives, the first linked list to the $(M−1)^{th}$ linked list may be cleared, and then a new expiration time is stored in each of the first linked list to the $(M−1)^{th}$ linked list. Each new expiration time is later than the expiration time $T_{M-1}$, and a new expiration time in an $i^{th}$ linked list is later than a new expiration time in an $(i−1)^{th}$ linked list.

Then, for each flow entry in the $M^{th}$ linked list, an expiration time in the flow entry is extracted, and an index of the flow entry is moved from the $M^{th}$ linked list to a corresponding linked list storing the expiration time.

Referring to FIG. 2-10, an operation of processing an expiration time in the integrated flow table may be summarized as: monitoring the integrated flow table; when it is detected that the target flow entry is found, checking the first expiration time in the target flow entry, and when it is detected that the first expiration time is changed to the second expiration time, moving the target flow entry, that is, moving the target flow entry from the row corresponding to the first expiration time to the row corresponding to the second expiration time; continuing to monitor an expiration time in the integrated flow table, that is, monitoring whether the integrated flow table includes an expiration time that is equal to a current time; and deleting a first mapping relationship, that is, when the expiration time that is equal to the current time is detected, deleting a flow entry in a row corresponding to the expiration time from the integrated flow table.

Step 204: Perform all other operations in the operation set on the first packet, to obtain a second packet corresponding to the first packet, and forward the second packet.

It should be noted that when all the other operations include a plurality of operations, the plurality of operations may be performed on the first packet concurrently or in a sequential order. When the plurality of operations are performed in a sequential order, although an operation that is first performed changes a field of the first packet or an attribute of the first packet, that is, the first packet changes, and an operation that is performed later is performed on a changed first packet, in this application, it is collectively referred to as that all these operations are performed on the first packet. This is why although second packet forwarding is described in step 204, in essence, a purpose of the method process is to forward information in the first packet, and a forwarding action in step 204 corresponds to the forwarding operation in the operation set corresponding to the first packet.

Optionally, each of the other operations may be performed on the first packet based on parameters of each of the other operations, and the second packet is obtained after all the other operations are performed.

For example, if the other operation is the operation of adding a vlan to a packet header, a field vlan is added to the packet header of the first packet, to obtain a second field, where the field vlan carries at least field content of the vlan included in a parameter of the other operation.

If the other operation is the operation of adding a vxlan to a packet header, a field vxlan is added to the packet header of the first packet, to obtain a second field, where the field vxlan carries at least field content of the vxlan included in a parameter of the other operation.

If the other operation is an operation of deleting a vlan from a packet header, a field vlan is deleted from the first packet based on a field identifier of the vlan included in a parameter of the other operation, to obtain the second packet.

If the other operation is an operation of deleting a vxlan from a packet header, a field vxlan is deleted from the first packet based on a field identifier of the vxlan included in a parameter of the other operation, to obtain the second packet.

If the other operation is the operation of modifying a transmit end MAC address in a packet header, field content of the transmit end MAC address in the first packet is replaced with a transmit end MAC address included in a parameter of the other operation, to obtain the second packet.

If the other operation is the operation of modifying a receive end MAC address in a packet header, field content of the receive end MAC address in the first packet is replaced with a receive end MAC address included in a parameter of the other operation, to obtain the second packet.

If the other operation is the operation of modifying a transmit end IP address in a packet header, field content of the transmit end IP in the first packet is replaced with a transmit end IP address included in a parameter of the other operation, to obtain the second packet.

If the other operation is the operation of modifying a receive end IP address in a packet header, field content of the receive end IP in the first packet is replaced with a receive end IP address included in a parameter of the other operation, to obtain the second packet.

If the other operation is the operation of modifying a transmit end port number in a packet header, field content of the transmit end port number in the first packet is replaced with a transmit end port number included in a parameter of the other operation, to obtain the second packet.

If the other operation is the operation of modifying a receive end port number in a packet header, field content of the receive end port number in the first packet is replaced with a receive end port number included in a parameter of the other operation, to obtain the second packet.

If the other operation is the operation of setting a priority of a packet, field content of a priority field of the first packet is replaced with a priority included in a parameter of the other operation, to obtain the second packet.

If the other operation is the operation of setting connection tracking, identifier information and status information of the first packet are obtained based on indication information included in a parameter of the other operation, and the identifier information and the status information of the first packet are stored in a correspondence between identifier information and status information.

In this embodiment of this application, because the target flow entry of the integrated flow table includes all operations of processing the first packet, all the operations corresponding to the first packet can be found by searching the integrated flow table based on the plurality of first packet header fields in the packet header of the first packet once, thereby improving efficiency of processing and forwarding the first packet. In addition, when the packet header of the first packet is parsed to obtain the plurality of first packet header fields, an AND operation is performed on a mask and the packet header of the first packet to obtain the plurality of first packet header fields, so that compared with a current case of parsing out the packet header fields in the packet header of the first packet one by one, parsing efficiency can be improved, and efficiency of processing and forwarding the first packet can be improved.

Referring to FIG. 3-1, an embodiment of this application provides a method for forwarding a packet based on an integrated flow table. For terms, steps, implementations, and technical effects corresponding to the foregoing method in the method, refer to the foregoing descriptions. For brevity, details are not described below. The method may be performed by the first device in the embodiment shown in FIG. 1-1 or FIG. 1-2, and includes the following steps.

Step 301: Obtain a third packet.

The third packet may be a packet from a virtual machine, or may be a packet sent by a physical device other than the first device. The virtual machine may run in the first device, or the virtual machine may run in a physical device other than the first device.

For example, when the first device may be a network element such as a router or a switch in a network, the first device may receive the third packet sent by a terminal, a server, or another network element in the network.

Alternatively, when the first device may be a server, the first device may receive the third packet sent by a device such as a terminal or another server, or the first device may include at least one virtual machine, and the first device may obtain the third packet from a virtual machine.

Alternatively, when the first device may be a terminal, the first device may receive the third packet sent by a device such as another terminal or a server, or the first device includes at least one virtual machine, and the first device may obtain the third packet from a virtual machine.

For content of the integrated flow table, refer to the descriptions of the integrated flow table in step 201 in the embodiment shown in FIG. 2-1, and details are not described herein again.

Optionally, after the third packet is obtained, a protocol of the third packet may further be parsed out, and if the protocol is a preset protocol in a preset protocol set, an operation in step 302 is performed, or if the protocol is not a preset protocol in a preset protocol set, an operation in step 304 is performed, that is, the third packet is directly forwarded by using an OVS. In this way, searching the integrated flow table for a corresponding operation is performed only for a packet belonging to a preset protocol.

The packet of the preset protocol usually belongs to a packet flow having relatively large traffic. Therefore, when the packet belonging to the preset protocol is received, processing and forwarding of the packet may be accelerated by using an operation in step 302 described below.

Step 302: Extract a plurality of second packet header fields from a packet header of the third packet.

The extracted plurality of second packet header fields have same categories as a plurality of packet header fields included in one flow entry of the integrated flow table.

For detailed content of parsing out the plurality of second packet header fields in the packet header of the second packet, refer to the descriptions of parsing out the plurality of first packet header fields in step 202 in the embodiment shown in FIG. 2-1, and details are not described herein again.

Optionally, when categories of packet header fields included in match items in flow entries of the integrated flow table are the same, a packet header field set including the plurality of first packet header fields is extracted from the packet header of the third packet.

Optionally, when categories of packet header fields included in match items in flow entries of the integrated flow table may be different, N packet header field sets including the plurality of first packet header fields are extracted from the packet header of the third packet, where N is an integer greater than 1.

Step 303: Search the integrated flow table based on the plurality of second packet header fields, to determine that the integrated flow table does not include a target flow entry matching the plurality of second packet header fields, and perform step 304.

When the categories of the packet header fields included in the match items in the flow entries of the integrated flow table may be the same, a packet header field set including the plurality of second packet header fields is extracted in step 302. Therefore, in this step, the integrated flow table is searched based on the plurality of second packet header fields.

When the categories of the packet header fields included in the match items in the flow entries of the integrated flow table may be different, N packet header field sets are extracted in step 302, and in this step, the integrated flow table may be searched by using the following steps of (1) to (5):

(1) Select one packet header field set from the N packet header field sets.

(2) Search the integrated flow table based on the selected packet header field set, and if a target flow entry matching the selected packet header field set is found, perform (3), or if no target flow entry matching the selected packet header field set is found, perform (4).

(3) Determine an operation set included in the target flow entry as an operation set corresponding to the third packet, end the process, and return.

(4) Determine whether the N packet header field sets include a packet header field set that is not selected previously, and if the N packet header field sets do not include a packet header field set that is not selected previously, end the process and return, or if the N packet header field sets include a packet header field set that is not selected previously, perform (5).

(5) Select, from the N packet header field sets, one packet header field set that is not selected previously, and perform (2).

Because the integrated flow table does not include the N packet header field sets, no operation set corresponding to the third packet is found in the integrated flow table based on each packet header field set by using the process of (1) to (5).

Step 304: Obtain at least one operation corresponding to the third packet and the plurality of second packet header fields in the packet header of the third packet from an OVS, and perform the at least one operation on the third packet.

When it is determined that the integrated flow table does not include the operation corresponding to the third packet, the OVS may parse out the plurality of second packet header fields in the packet header of the third packet, and determine, based on the plurality of second packet header fields, the at least one operation corresponding to the third packet.

In this step, the plurality of second packet header fields and the at least one operation may be obtained, where the at least one operation includes a forwarding operation, and the at least one operation is performed on the third packet.

Optionally, the at least one operation may further include at least one other operation performed before the forwarding operation, the at least one other operation may be performed on the third packet to obtain a fourth packet, and then the fourth packet is forwarded.

Referring to FIG. 3-2, the OVS includes an exact match cache (EMC) table and a data flow table. The OVS may further include a communication protocol, and the communication protocol may be an Openflow communication protocol.

Optionally, the data flow table includes at least one hash table, the data flow table stores an operation corresponding to at least one packet, for each packet, at least one operation corresponding to the packet is stored in different hash tables in the data flow table, and the hash table may store a mapping relationship including a plurality of packet header fields in a packet header of the packet and one operation corresponding to the packet.

The EMC table is a hash table, the EMC table stores operations corresponding to some packets in the data flow table, and for each of the some packets, the EMC table stores a mapping relationship including a plurality of packet header fields in a packet header of the packet and one operation corresponding to the packet. Because each mapping relationship includes only one operation, the EMC table stores at least one mapping relationship corresponding to the packet, and at least one operation corresponding to the packet is stored in the at least one mapping relationship.

In this step, when it is determined that the integrated flow table does not include the operation set corresponding to the third packet, the third packet may be input to the OVS. Referring to FIG. 3-3, the OVS receives the third packet, extracts the plurality of second packet header fields in the packet header of the third packet, searches the EMC table based on the plurality of second packet header fields, and if the at least one operation corresponding to the third packet is found in the EMC table, processes the third packet based on the at least one operation, and may forward, by using a network interface card (NIC), the fourth packet obtained after the processing.

It can be understood that because the integrated flow table described in this application does not include the operation set corresponding to the third packet, and a process of processing the third packet by using a flow table of the OVS is similar to the solution in the prior art, the following further describes an effect of the technical solutions of this application by using the process of processing the third packet by using the flow table of the OVS. Because each mapping relationship in the EMC includes only one operation, the at least one operation corresponding to the third packet is distributed in different mapping relationships. Assuming that the third packet corresponds to five operations, the five operations are distributed in five mapping relationships, where each of the five mapping relationships includes the plurality of second packet header fields and an operation corresponding to the third packet. In this way, when the EMC table is searched based on the plurality of second packet header fields, after a first mapping relationship including the plurality of second packet header fields is found, the EMC table continues to be searched based on the plurality of second packet header fields for a second mapping relationship including the plurality of second packet header fields, and then the EMC table continues to be searched based on the plurality of second packet header fields for a third mapping relationship including the plurality of second packet header fields. According to the foregoing manner, after a fifth mapping relationship including the plurality of second packet header fields is found, if there is still a mapping relationship that is not searched, searching continues to be performed, and until searching on the entire EMC table is completed, it is determined that all operations corresponding to the third packet are found.

However, referring to the embodiment shown in FIG. 2-1, it can be learned that the first packet carries information needing to be forwarded, and the first packet is a packet needing to be processed based on the method for forwarding a packet based on an integrated flow table in this application. When the integrated flow table is searched based on the plurality of first packet header fields of the first packet, when the target flow entry matching the plurality of first packet header fields is found, the operation set in the target flow entry includes a forwarding operation and all other operations, where all the other operations are operations performed on the fields of the first packet between the operation of determining an operation set corresponding to the first packet and the forwarding operation, that is, all other operations performed on the first packet. Therefore, an operation required for forwarding the information in the first packet does not need to be searched in another flow table. Therefore, all operations of forwarding the information carried in the first packet are obtained when the target flow entry is found, and there is no need to search a flow entry that is not searched in the integrated flow table. In other words, for a packet for which a target flow entry can be found in the integrated flow table, the packet can be forwarded by using only the integrated flow table, thereby improving efficiency of obtaining an operation of processing a packet.

If the at least one operation of the plurality of second packet header fields is not found in the EMC table, the hash table in the data flow table is searched based on the plurality of second packet header fields. If the at least one operation corresponding to the third packet is found in the data flow table, the third packet is processed based on the at least one operation, and the fourth packet obtained after the processing may be forwarded by using the NIC. If the at least one operation corresponding to the third packet is not found in the data flow table, the first device communicates with a server according to the communication protocol, to obtain the at least one operation corresponding to the third packet from the server, processes the third packet based on the at least one operation, and may forward, by using the NIC, the fourth packet obtained after the processing.

Because the at least one operation corresponding to the third packet is stored in different hash tables in the data flow table, assuming that the third packet corresponds to five operations, the five operations are distributed in five hash tables. A first hash table in which a first operation is located includes a mapping relationship between the plurality of second packet header fields, the first operation, and an address of a second hash table, and the second hash table is a hash table in which a second operation is located. The second hash table includes a mapping relationship between the plurality of second packet header fields, the second operation, and an address of a third hash table, and the third hash table is a hash table in which a third operation is located. The third hash table includes a mapping relationship between the plurality of second packet header fields, the third operation, and an address of a fourth hash table, and the fourth hash table is a hash table in which a fourth operation is located. The fourth hash table includes a mapping relationship between the plurality of second packet header fields, the fourth operation, and an address of a fifth hash table, and the fifth hash table is a hash table in which a fifth operation is located. The fifth hash table includes a mapping relationship between the plurality of second packet header fields and the fifth operation.

In this way, when the hash tables in the data flow table are searched based on the plurality of second packet header fields, the first hash table in the data flow table is first searched, and if a mapping relationship including the plurality of second packet header fields is not found after the first hash table is searched, the second hash table in the data flow table is searched until the first hash table is searched. The first hash table is searched based on the plurality of second packet header fields for the first mapping relationship including the plurality of second packet header fields, where the first mapping relationship includes the plurality of second packet header fields, the first operation, and the address of the second hash table. Switching is performed based on the address of the second hash table to search the second hash table, and the second hash table is searched based on the plurality of second packet header fields for the second mapping relationship including the plurality of second packet header fields, where the second mapping relationship includes the plurality of second packet header fields, the second operation, and the address of the third hash table. According to the foregoing manner, searching is performed until the fifth mapping relationship including the plurality of second packet header fields is found in the fifth hash table, where the fifth mapping relationship includes the plurality of second packet header fields and the fifth operation. Because the fifth mapping relationship does not include an address of a hash table, searching is stopped.

However, referring to the embodiment shown in FIG. 2-1, when the integrated flow table is searched based on the plurality of first packet header fields of the first packet, when the target flow entry matching the plurality of first packet header fields is found, because the operation set in the target flow entry includes the forwarding operation and all the other operations of processing the first packet, all operations of processing the first packet are obtained when the target flow entry is found, unlike a case in which different hash tables need to be switched and searched during searching a data flow table, thereby improving efficiency of obtaining an operation of processing a packet.

If the at least one operation corresponding to the third packet is not found in the data flow table, the first device communicates with the server according to the communication protocol, and a time required for obtaining the at least one operation through communication with the server is far longer than a time of obtaining an operation from the data flow table. As a result, a time of obtaining an operation from the server is far longer than a time of obtaining an operation from the integrated flow table in the embodiment shown in FIG. 2-1. Therefore, efficiency of obtaining the operation from the integrated flow table and processing the packet is greatly improved.

Step 305: Generate, in the integrated flow table, a flow entry including the plurality of second packet header fields and the at least one operation.

Optionally, an expiration time may be set for the generated flow entry, and is stored in the flow entry. The generated flow entry may be added to a row corresponding to the specified expiration time in the integrated flow table.

Optionally, an operation of adding the generated flow entry to the row corresponding to the specified expiration time may be:

determining whether the integrated flow table includes the row including the specified expiration time, and if the integrated flow table includes the row, adding the generated flow entry to the row, or if the integrated flow table does not include the row, generating, in the integrated flow table, a row including the specified expiration time and the generated flow entry.

Referring to FIG. 3-4, for the embodiment described in FIG. 2-1 and the embodiment shown in FIG. 3-1, procedures in the two embodiments may be summarized as the following operations: obtaining a packet; obtaining a plurality of packet header fields of the packet; searching an integrated flow table based on the plurality of packet header fields; and if a target flow entry matching the plurality of packet header fields is found, processing the packet based on an operation set included in the target flow entry; or if a target flow entry matching the plurality of packet header fields is not found, obtaining at least one operation and the plurality of packet header fields from an OVS, processing the packet based on the at least one operation, and generating, in the integrated flow table, a flow entry including the obtained plurality of packet header fields and the at least one operation.

In this embodiment of this application, when the operation set corresponding to the third packet is not found in the integrated flow table, the at least one operation corresponding to the third packet is obtained from the OVS, and the flow entry including the plurality of second packet header fields in the third packet and the at least one operation is generated in the integrated flow table. In this way, when the third packet is obtained subsequently, the operation set corresponding to the third packet can be directly obtained from the integrated flow table, thereby improving efficiency of subsequently processing and forwarding the third packet.

Referring to FIG. 4-1, an embodiment of this application provides an apparatus 400 for forwarding a packet based on an integrated flow table. The apparatus 400 may be configured to implement the embodiment shown in FIG. 2-1 or the embodiment shown in FIG. 3-1, and may further implement a function of the first device in the embodiment shown in FIG. 1-1 or the embodiment shown in FIG. 1-2.

The integrated flow table includes a plurality of flow entries, each of the plurality of flow entries includes a mapping relationship between a match item and an operation set, the match item includes a plurality of packet header fields, the operation set includes a forwarding operation, and the apparatus 400 includes:

a processing module 401, configured to: obtain a first packet; extract a plurality of first packet header fields from a packet header of the first packet, where the plurality of first packet header fields have same categories as a plurality of packet header fields included in one of the plurality of flow entries; search the integrated flow table for a target flow entry matching the plurality of first packet header fields, to determine an operation set corresponding to the first packet, where the operation set corresponding to the first packet further includes all other operations performed on the first packet between the operation of determining an operation set corresponding to the first packet and the forwarding operation; and perform all the other operations in the operation set on the first packet, to obtain a second packet corresponding to the first packet; and a transceiver module 402, configured to forward the second packet.

The transceiver module 402 may include a communications interface of a physical machine or a communications interface of a network interface card, or may be code used to invoke a communications interface of a physical machine or a communications interface of a network interface card. The communications interface includes at least one component or unit used to implement communication between nodes, for example, an antenna or a port.

Optionally, the apparatus 400 in this embodiment may be implemented by using a physical machine or implemented by using a network interface card of a physical machine.

When the apparatus 400 is implemented by using a physical machine, code of the apparatus 400 may be stored in a memory of the physical machine, and a processor of the physical machine invokes the code of the apparatus 400 in the memory, to invoke the communications interface of the physical machine to implement a packet forwarding function.

When the apparatus 400 is implemented by using a network interface card, code of the apparatus 400 may be stored in a storage medium of the network interface card, and a processing circuit of the network interface card runs the code of the apparatus 400 in the storage medium, to invoke a communications interface of the network interface card to implement a packet forwarding function.

Optionally, all the other operations may be any one of or a combination of a plurality of the following operations: an operation of adding a field to a packet header, an operation of deleting a field from a packet header, an operation of modifying content of a field in a packet header, an operation of setting a priority of a packet, and an operation of setting connection tracking.

Optionally, when extracting the plurality of first packet header fields from the packet header of the first packet, the processing module 401 is configured to perform an AND operation on the packet header of the first packet and one mask, to obtain the plurality of first packet header fields of the first packet, where the mask indicates locations of the plurality of first packet header fields in the packet header of the first packet.

Optionally, the processing module 401 is further configured to generate a first mask, where the first mask and the packet header of the first packet have a same byte length, and non-zero bits in the first mask correspond to the plurality of packet header fields included in the target flow entry.

Optionally, the plurality of flow entries are located in a plurality of rows of the integrated flow table, each of the plurality of rows of the integrated flow table corresponds to one expiration time, the expiration time is used to indicate a moment of deleting a flow entry in a row corresponding to the expiration time from the integrated flow table, and the target flow entry is located in a row corresponding to a first expiration time.

Optionally, the processing module 401 is further configured to:

after the integrated flow table is searched for the target flow entry matching the plurality of first packet header fields, to determine the operation set corresponding to the first packet, move the target flow entry from the row corresponding to the first expiration time to a row corresponding to a second expiration time, where the second expiration time is later than the first expiration time.

Optionally, the processing module 401 is configured to update the first expiration time to the second expiration time.

Optionally, the target flow entry further includes a time difference between the second expiration time and the first expiration time, and the time difference is in a one-to-one correspondence to the target flow entry, or a time difference having a same value as the time difference is also used to change an expiration time corresponding to at least one other target flow entry of the integrated flow table.

Optionally, the processing module 401 is further configured to:

obtain a third packet:

extract a plurality of second packet header fields from a packet header of the third packet, where the plurality of second packet header fields have same categories as the plurality of packet header fields included in one of the plurality of flow entries;

when the integrated flow table does not include a target flow entry matching the plurality of second packet header fields, obtain at least one operation corresponding to the third packet from an OVS, where the at least one operation includes a forwarding operation; and perform the at least one operation on the third packet.

Optionally, the processing module 401 is further configured to:

obtain the plurality of second packet header fields in the packet header of the third packet from the OVS, and store a flow entry including the obtained plurality of second packet header fields and the at least one operation in the integrated flow table.

Optionally, a category of a field in the packet header is a type of information corresponding to the field, or a location of the field in the packet header of the first packet.

Optionally, it should be noted that the apparatus 400 may be integrated in the OVS, or may not be integrated into the OVS. When the apparatus 400 is not integrated into the OVS, the processing module 401 in the apparatus 400 may monitor the OVS, and when detecting that the OVS parses out one second target field set in the packet header of the third packet and generates at least one operation corresponding to the third packet, obtain the second target field set and the at least one operation.

Referring to FIG. 4-2 or FIG. 4-3, FIG. 4-2 shows that the apparatus 400 is not integrated with the OVS, and the apparatus 400 may communicate with the OVS, while FIG. 4-3 shows that the apparatus 400 is integrated with the OVS, and the OVS may be used as a module in the apparatus 400.

For ease of understanding, the following describes an implementation of the processing module 401 by way of example. The processing module 401 may include a control interface, an aging unit, an integrated flow table, a monitoring unit, a parsing unit, and a processing unit. In addition, it should be understood that the implementation is merely a description, and should not be construed as a limitation on implementation of the method and the apparatus in this application. A specific implementation and composition of the processing module 401 are not limited in this application.

The parsing unit is configured to parse out a plurality of packet header fields in a packet header of a packet. The packet may be the first packet or the third packet.

Optionally, the parsing unit is configured to: perform an AND operation on the packet header of the packet and one mask, to obtain a plurality of packet header fields in the packet header; and if the plurality of packet header fields are one preset packet header field set, buffer the plurality of packet header fields into the packet header field set.

The parsing unit may perform an AND operation on the packet header of the packet and a plurality of different masks, to obtain a plurality of packet header field sets.

The preset packet header field set may be preset by a user by using the control interface.

The processing unit is configured to: search the integrated flow table based on the plurality of packet header fields in the packet field set parsed out by the parsing unit, and if a target flow entry matching the plurality of packet header fields is found, process the packet based on an operation set included in the target flow entry, and forward the processed packet by using the transceiver module 402.

Optionally, when the target flow entry is found in the integrated flow table, the processing unit may further change the first expiration time in the target flow entry to the second expiration time, where the second expiration time is later than the first expiration time.

Optionally, the target flow entry may include a time difference, and the time difference may be set in the target flow entry by the user by using the control interface. Time differences specified for the flow entries of the integrated flow table may be the same or may be different. In this way, the processing unit may read the time difference from the target flow entry, extend the first expiration time by the time difference to obtain the second expiration time, and change the first expiration time in the target flow entry to the second expiration time.

The processing unit is further configured to: when the target flow entry corresponding to the packet is not found, input the packet to the OVS, and process the packet by using the OVS.

The monitoring unit is configured to: when the processing unit does not find the target flow entry corresponding to the packet, monitor the OVS, obtain the plurality of packet header fields in the packet header of the packet and the at least one operation corresponding to the packet from the OVS, and store a flow entry including the plurality of packet header fields and the at least one operation in the integrated flow table.

Optionally, the aging unit may check the integrated flow table, and when detecting that an expiration time in a flow entry of the integrated flow table is equal to a current time, delete the flow entry.

Optionally, when the apparatus 400 is not integrated with the OVS, the OVS may be implemented by using a physical machine or a network interface card of a physical machine. Optionally, the apparatus 400 and the OVS may be stored in a same memory, or may be stored in different memories.

When code of the apparatus 400 and code of the OVS may be stored in a same memory, and the OVS is implemented by using a physical machine, the code of the apparatus 400 and the code of the OVS may be stored in a memory of the physical machine, and a processor of the physical machine invokes the code of the apparatus 400 in the memory and runs the code of the apparatus 400 to implement a packet forwarding function, or a processor of the physical machine invokes the code of the apparatus 400 and the code of the OVS in the memory, and runs the code of the apparatus 400 and the code of the OVS to implement a packet forwarding function. When the OVS is implemented by using a network interface card, the code of the apparatus 400 and the code of the OVS may be stored in a storage medium of the network interface card, and a processing circuit of the network interface card invokes the code of the apparatus 400 in the storage medium and runs the code of the apparatus 400 to implement a packet forwarding function, or a processing circuit of the network interface card invokes the code of the apparatus 400 and the code of the OVS in the storage medium and runs the code of the apparatus 400 and the code of the OVS to implement a packet forwarding function.

When the code of the apparatus 400 and the code of the OVS are stored in different memories, the code of the apparatus 400 may be stored in a memory of the physical machine, and the code of the OVS may be stored in a storage medium of the network interface card, and a processor of the physical machine invokes the code of the apparatus 400 in the memory and runs the code of the apparatus 400 to obtain all operations of processing the packet, process the packet based on all the operations, and forward the processed packet. If none of the operations for the packet is obtained by using the code of the apparatus 400, a processing circuit of the network interface card is controlled to invoke the code of the OVS in the storage medium to forward the packet.

Alternatively, the code of the apparatus 400 may be stored in a storage medium of the network interface card, the code of the OVS may be stored in a memory of the physical machine, and a processing circuit of the network interface card invokes the code of the apparatus 400 in the storage medium and runs the code of the apparatus 400 to obtain all operations of processing the packet, process the packet based on all the operations, and forward the processed packet. If none of the operations for the packet is obtained by using the code of the apparatus 400, a processor of the physical machine invokes the code of the OVS in the memory to forward the packet.

In this embodiment of this application, because the target flow entry corresponding to the first packet in the integrated flow table includes all operations of processing the first packet, the processing module can find, by searching the integrated flow table based on the plurality of packet header fields in the packet header of the first packet once, all operations corresponding to the first packet, thereby improving efficiency of processing and forwarding the first packet by the processing module.

Figures 1, 2:
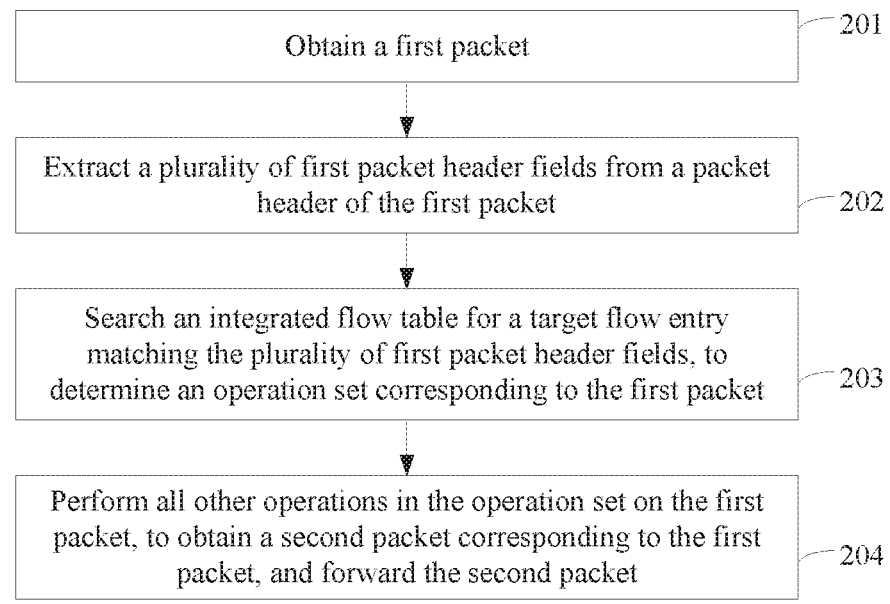
Figures 2, 3:
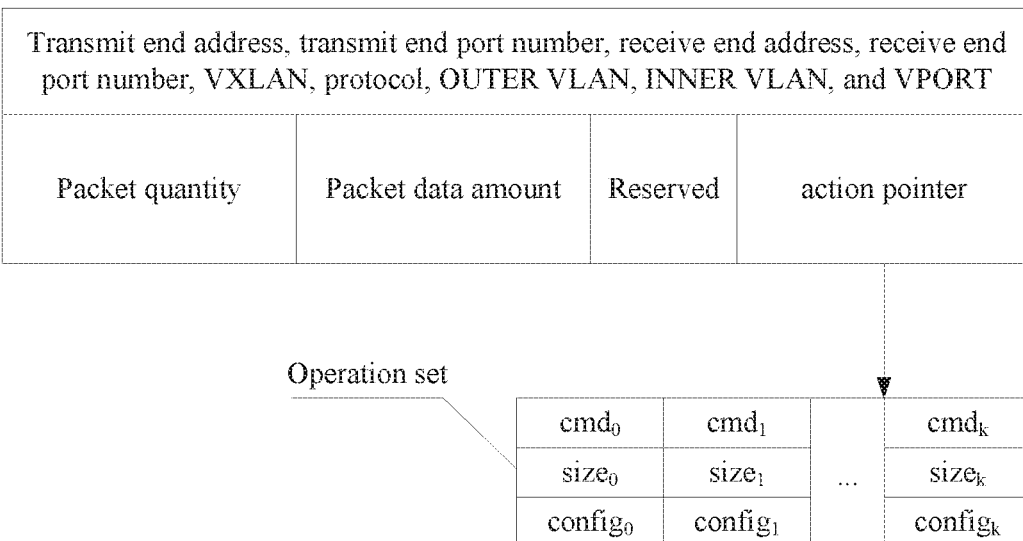
Figures 2, 3, 4:
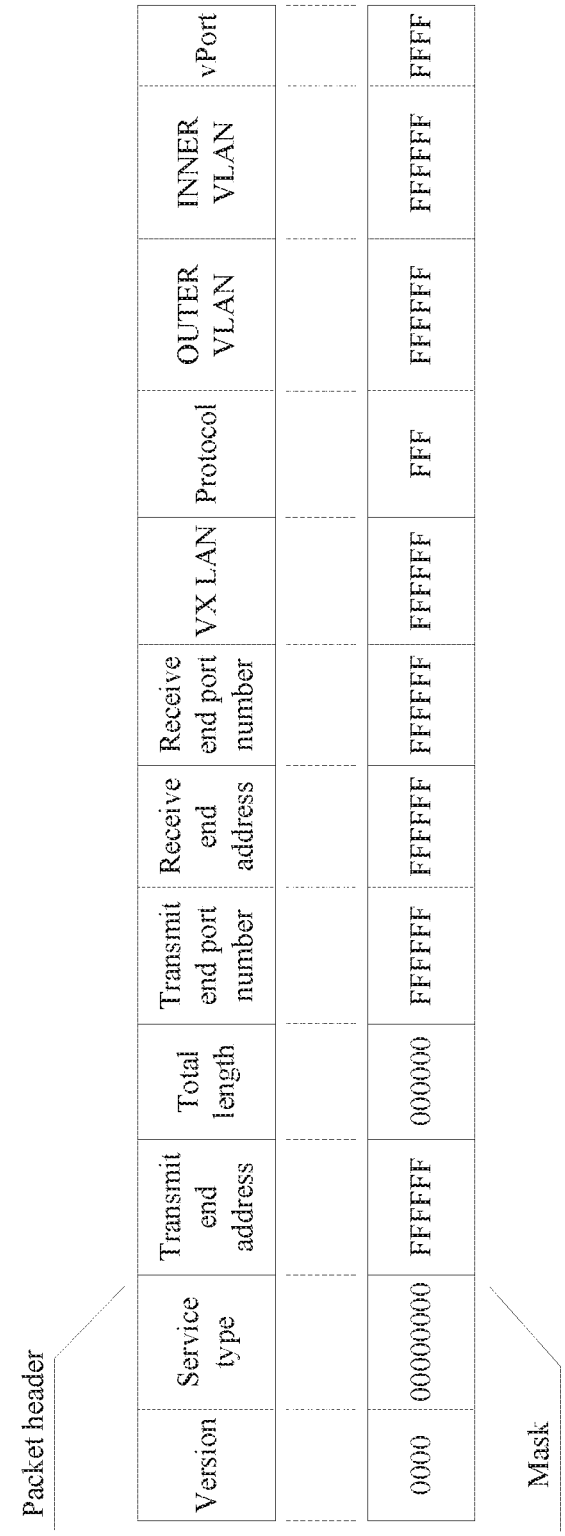
Figures 2, 3, 4, 5:
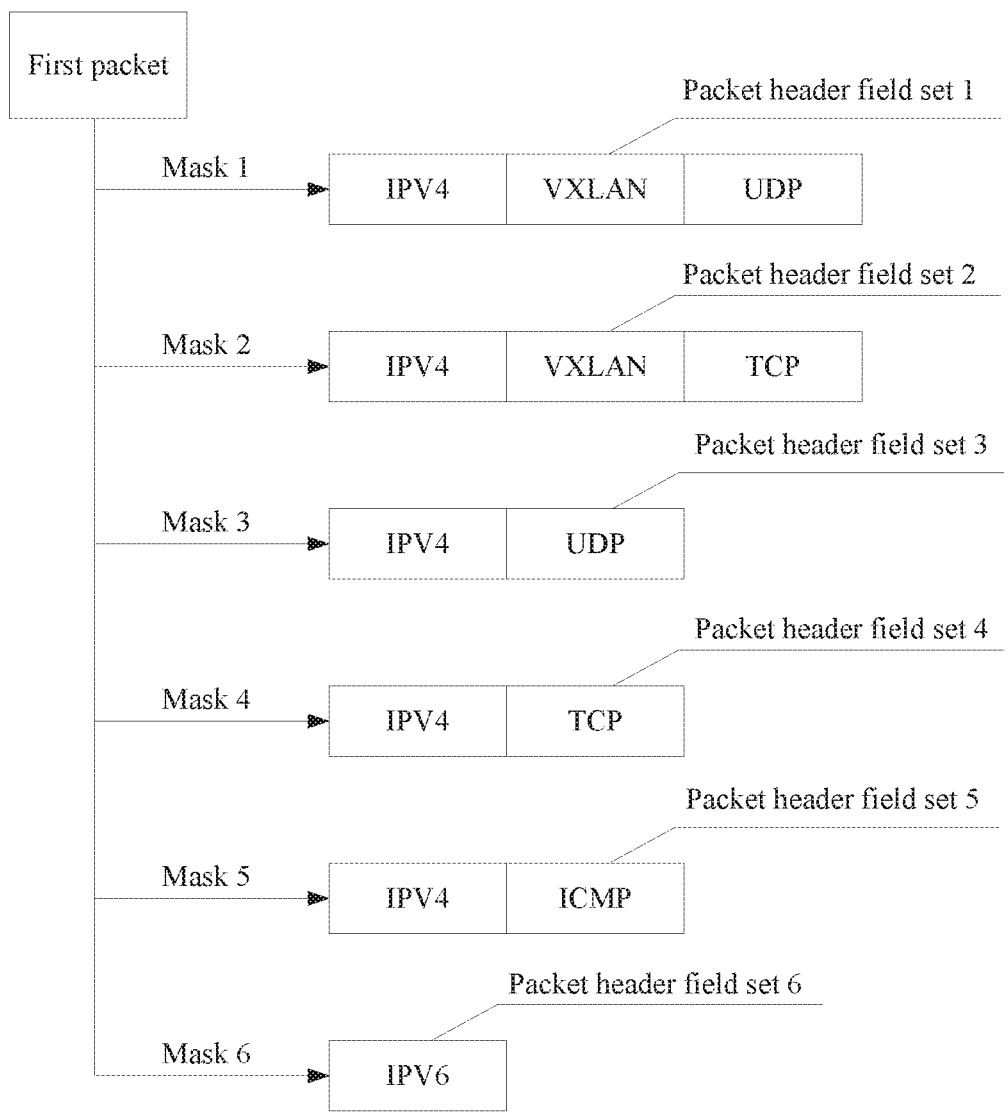
Figures 2, 3, 4, 5, 6:
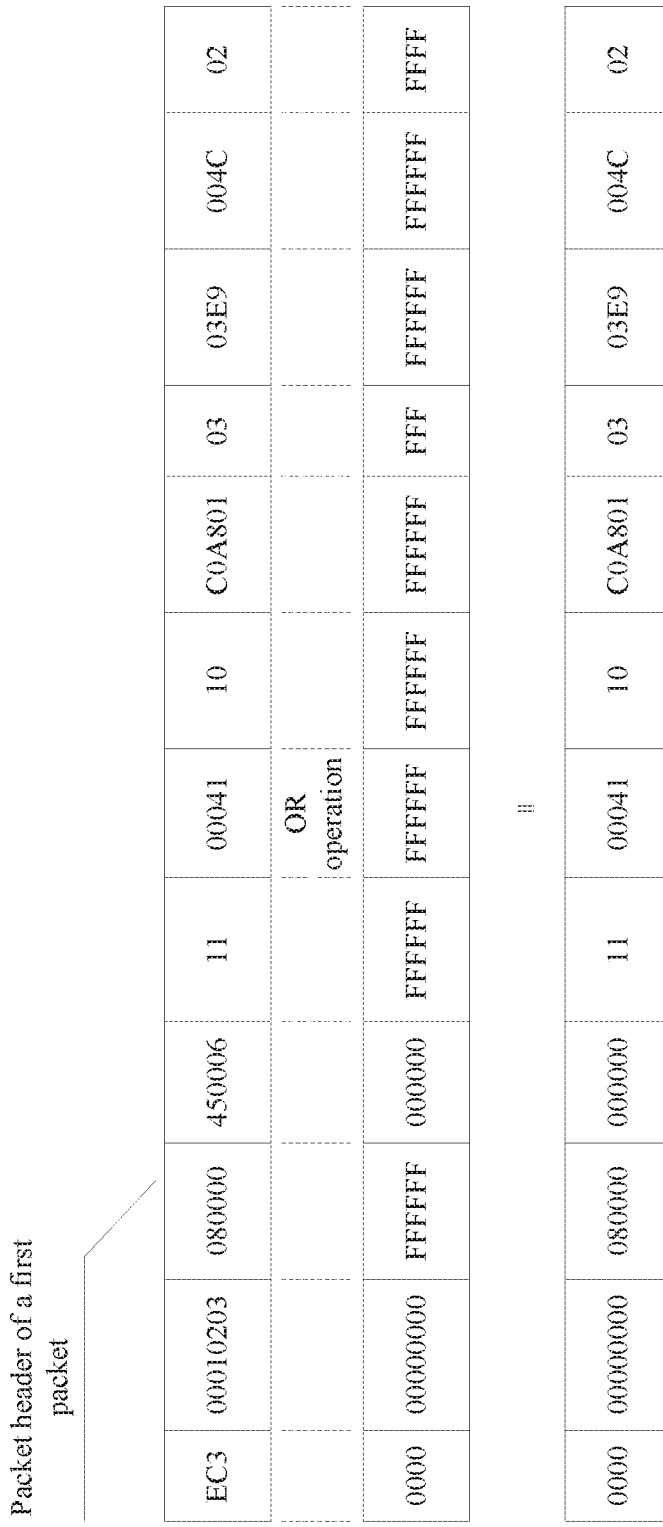
Figures 2, 3, 4, 5, 6, 7:
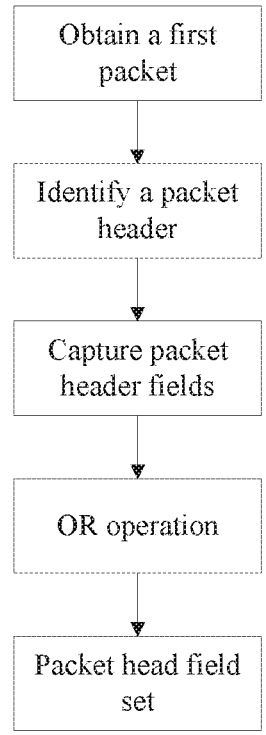
Figures 2, 3, 4, 5, 6, 7, 8:
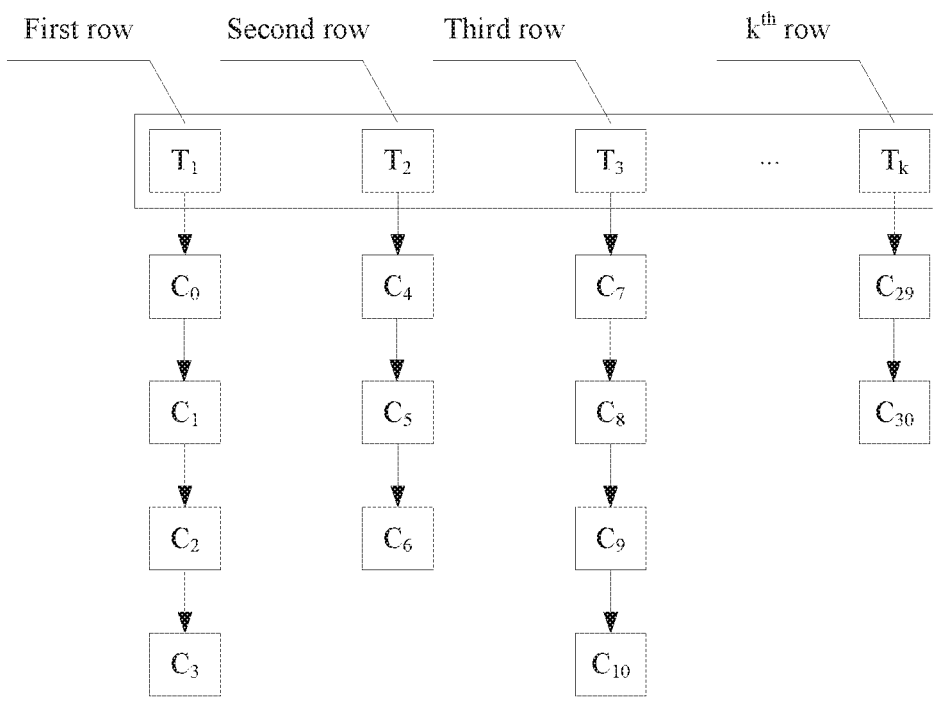
Figures 2, 3, 4, 5, 6, 7, 8, 9:
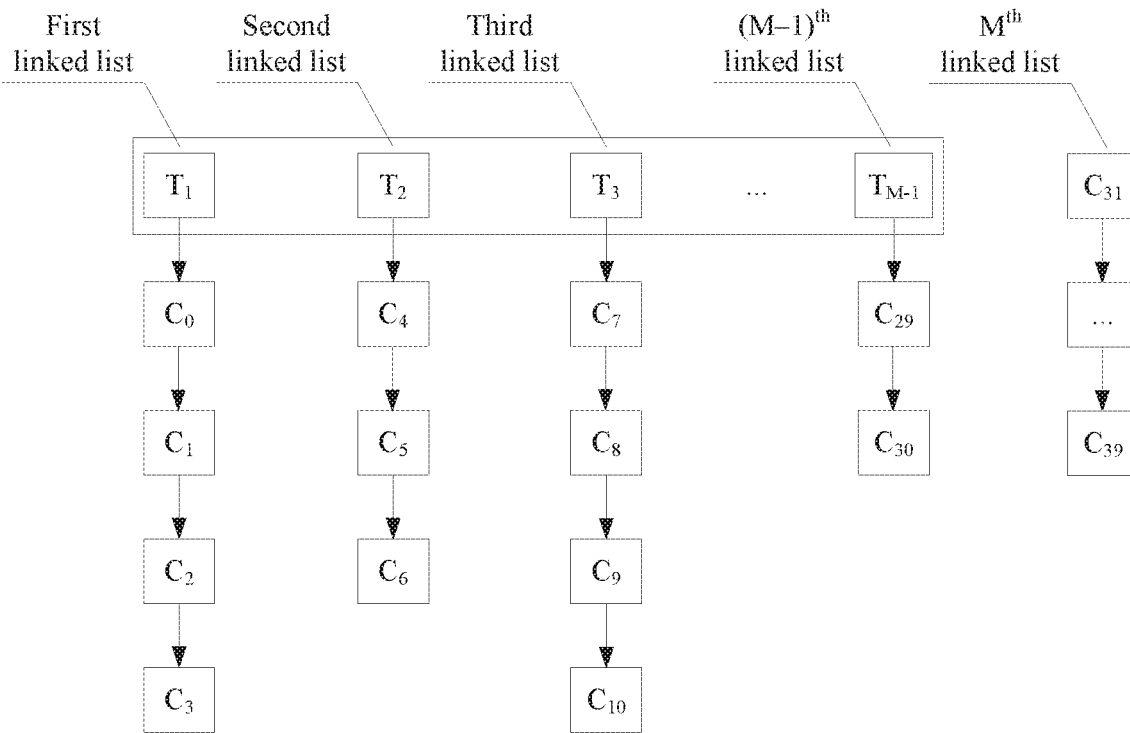
Figures 2, 3, 4, 5, 6, 7, 8, 9, 10:
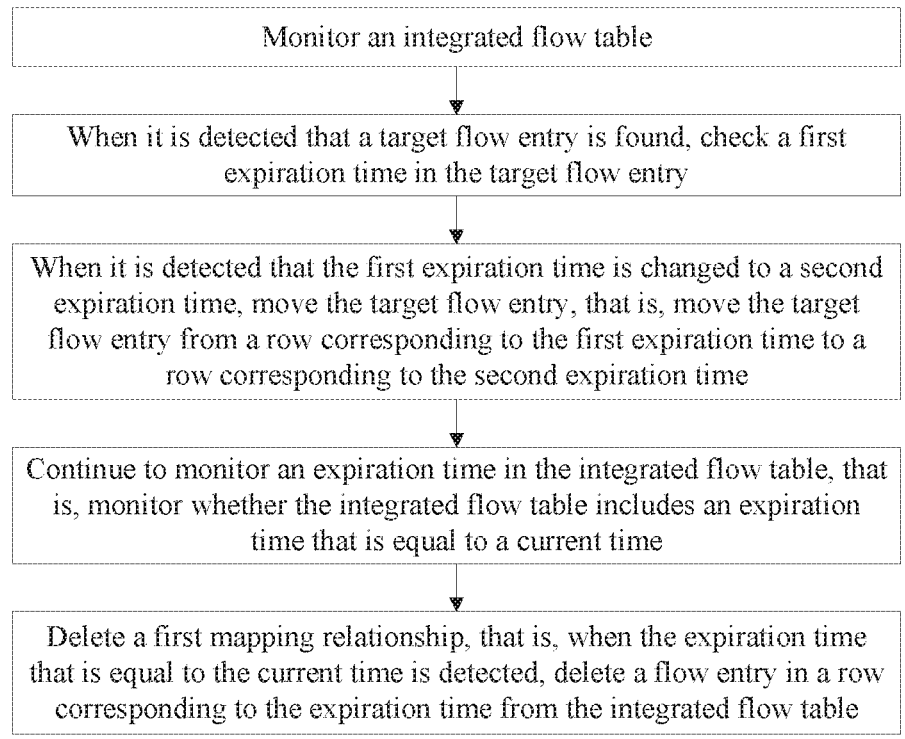
Figures 1, 3:
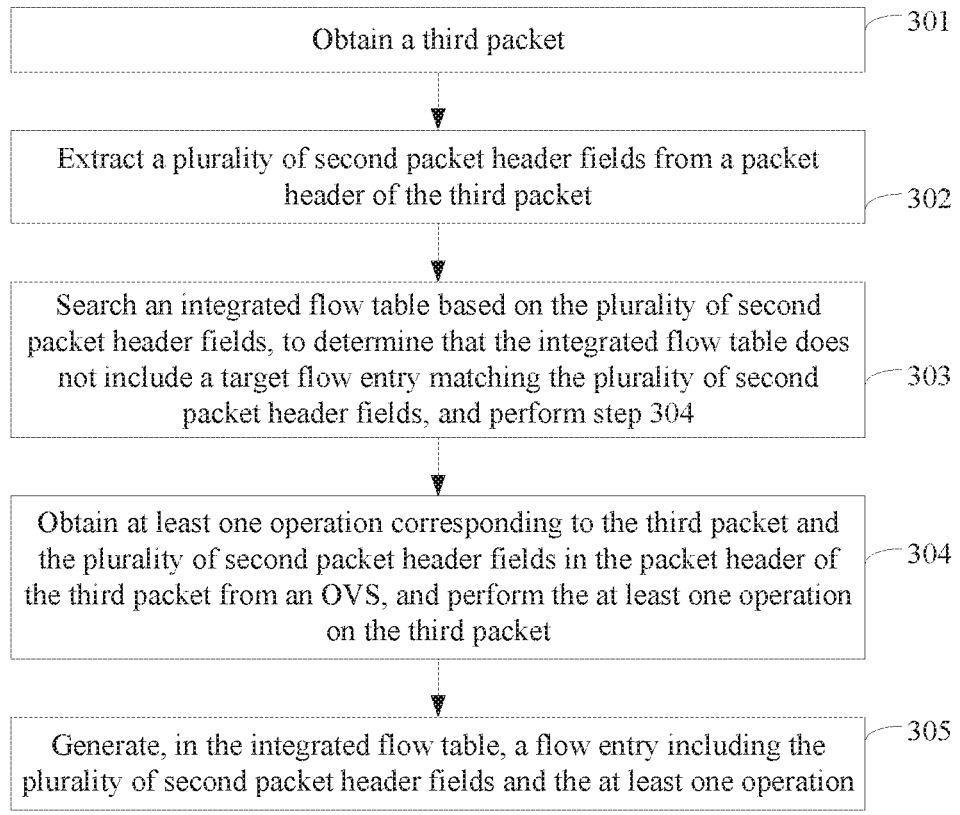
Figures 2, 3:
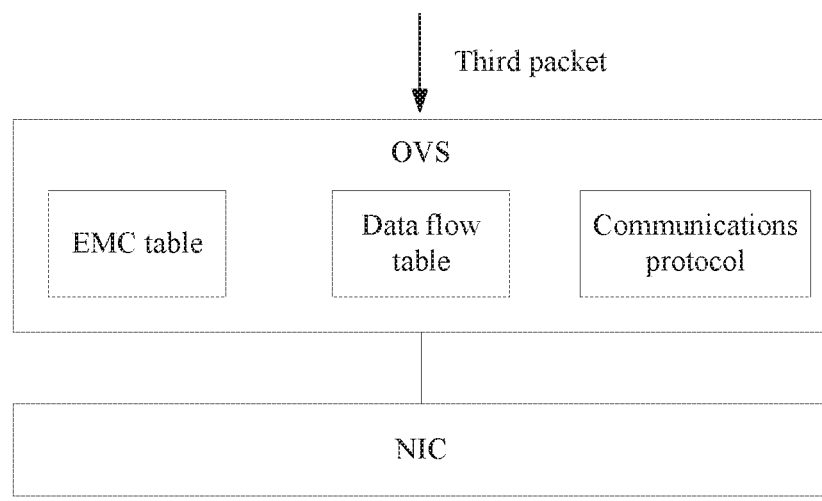
Figure 3:
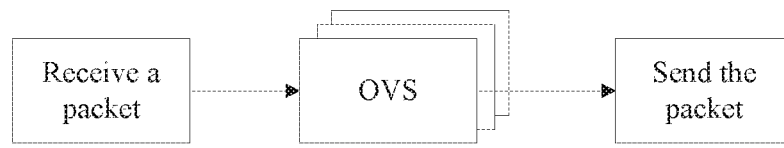
Figures 3, 4:
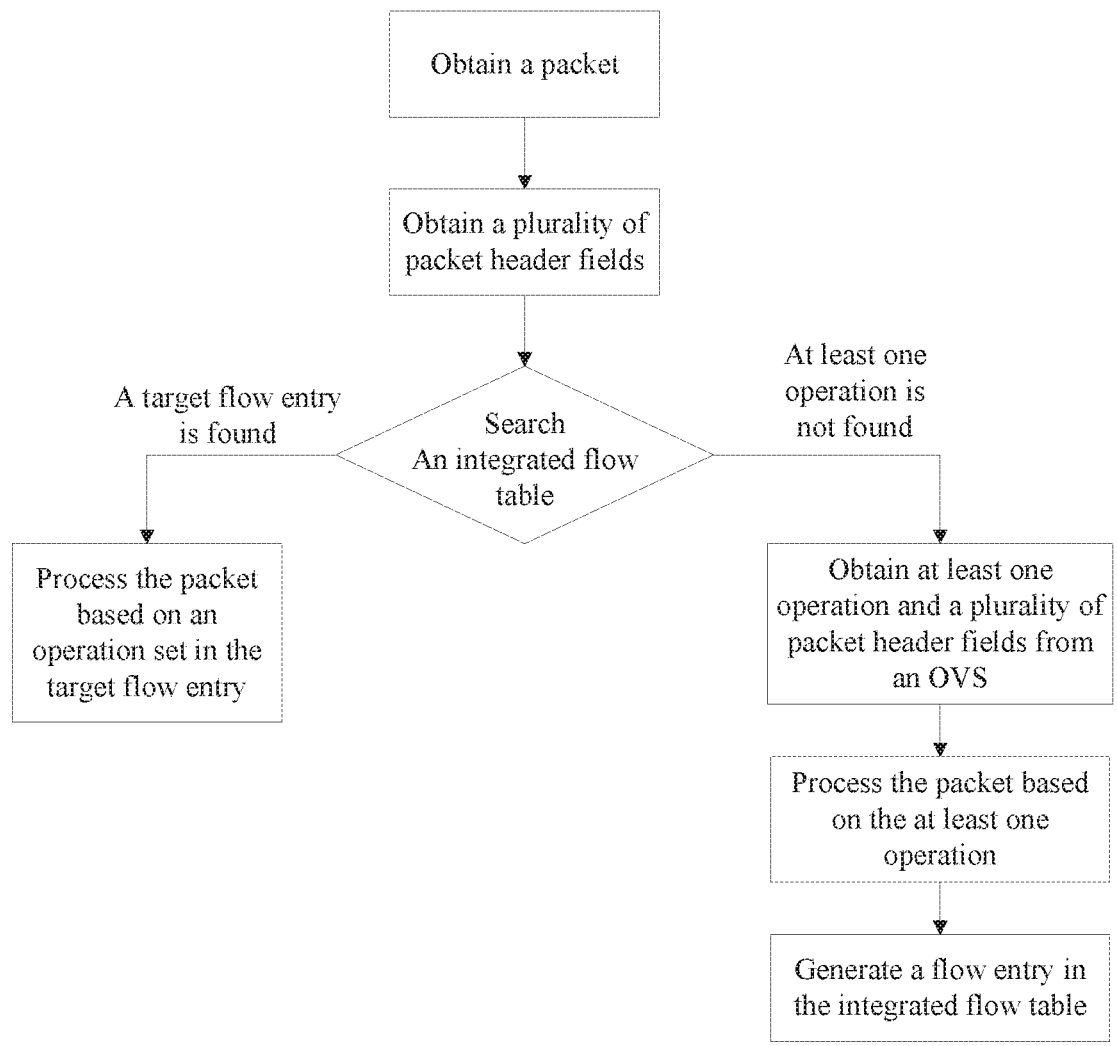
Figures 1, 4:
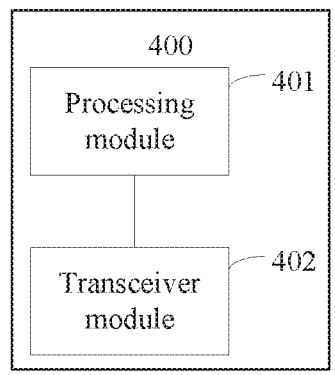
Figures 2, 4:
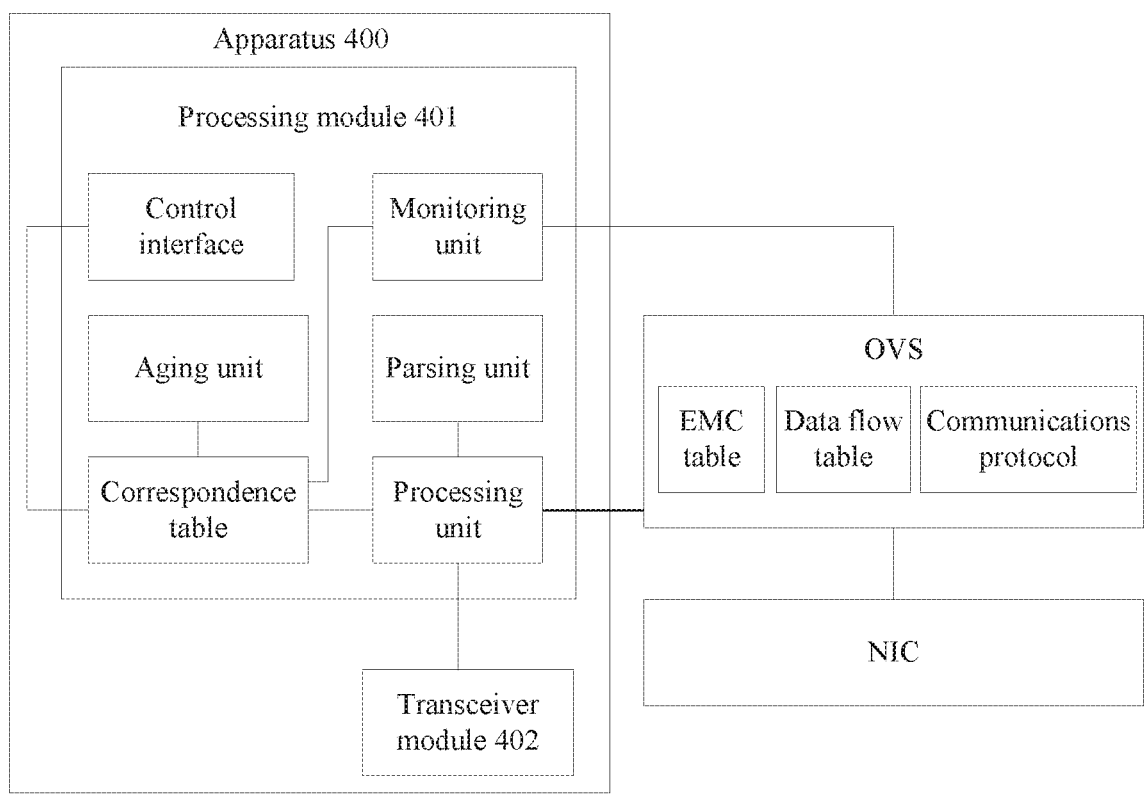
Figures 3, 4:
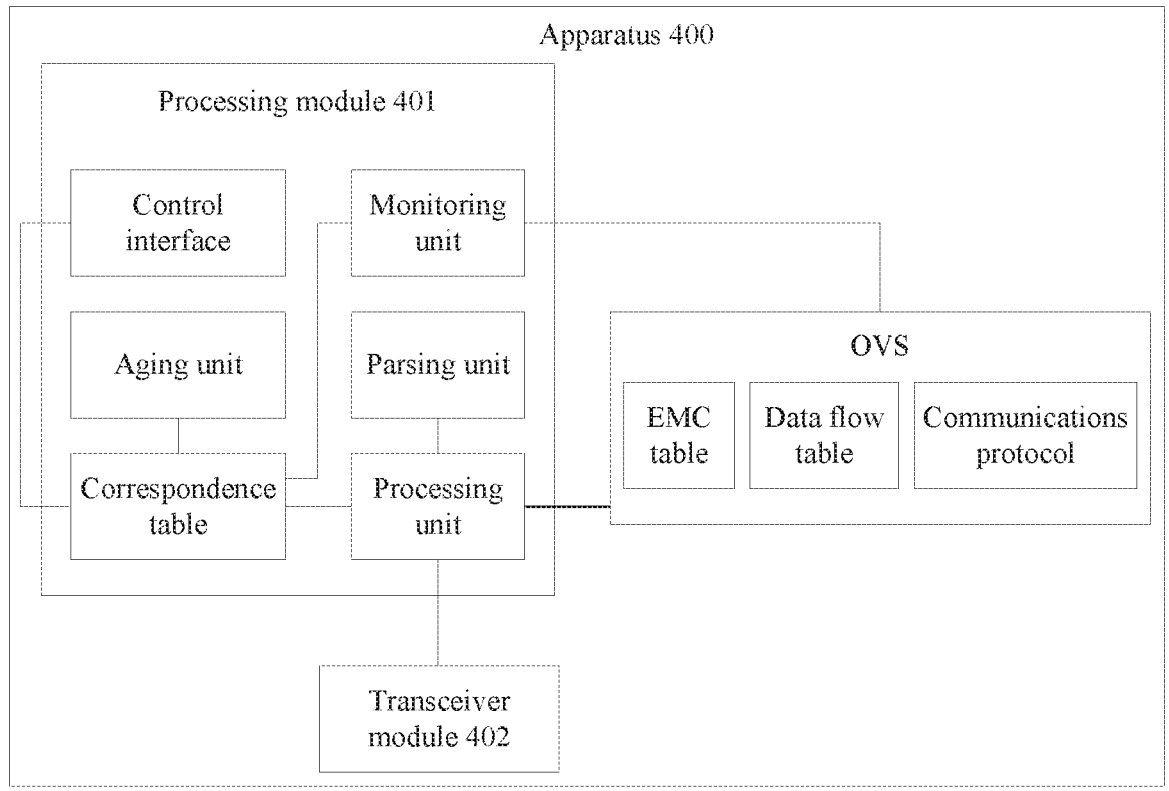
Figure 5:
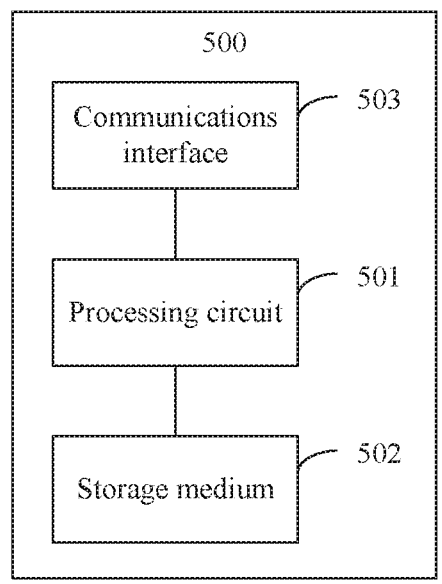

FIG. 5 is a schematic structural diagram of an apparatus 500 for forwarding a packet based on an integrated flow table according to an embodiment of this application. The apparatus 500 includes a processing circuit 501, a storage medium 502, and a communications interface 503. The processing circuit 501 is connected to both the storage medium 502 and the communications interface 503.

The apparatus 500 is an apparatus of a hardware structure, and may be configured to implement function modules in the apparatus in FIG. 4-1. For example, a person skilled in the art may figure out that the processing module 401 in the apparatus 400 in FIG. 4-1 may be implemented by the processing circuit 501 by invoking code in the storage medium 502, and the transceiver module 402 in the apparatus 400 shown in FIG. 4-1 may be implemented by using the communications interface 503, or by the processing circuit 501 by invoking code, used to invoke the communications interface 503, in the storage medium 502.

Optionally, the apparatus 500 may be a physical machine including a processor and a memory. In other words, the processing circuit 501 may include one or more processors, and the storage medium 502 may be the memory.

Optionally, the apparatus 500 may alternatively be a network interface card of a physical machine, and the processing circuit 501 and the storage medium 502 are respectively a physical circuit and a storage medium in the network interface card.

The apparatus 500 may further be configured to implement a function of the first device in either embodiment described in FIG. 1-1 and FIG. 1-2, or implement either embodiment shown in FIG. 2-1 and FIG. 3-1.

Optionally, the processing circuit 501 may be a general central processing unit (CPU), a microprocessor, an application-specific integrated circuit (ASIC), or one or more integrated circuits configured to control execution of a program of the solutions of this application.

The communications interface 503 is configured to communicate with another device or a communications network, for example, Ethernet, a radio access network (RAN), or a wireless local area network (WLAN).

The storage medium 502 may be a read-only memory (ROM) or another type of static storage device that can store static information and an instruction, or a random access memory (RAM) or another type of dynamic storage device that can store information and an instruction, or may be but is not limited to an electrically erasable programmable read-only memory (EEPROM), a magnetic disk storage medium or another magnetic storage device, or any other medium that can carry or store expected program code in a form of an instruction or a data structure and that can be accessed by a computer.

The storage medium 502 is configured to store application program code of executing the solutions of this application, and the processing circuit 501 controls execution of the application program code. The processing circuit 501 is configured to execute the application program code stored in the storage medium 502, to implement functions in the method in this patent.

The sequence numbers of the foregoing embodiments of this application are merely for description, and are not intended to indicate priorities of the embodiments.

A person of ordinary skill in the art may understand that all or some of the steps of the embodiments may be implemented by hardware or by a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, improvement, or the like made without departing from the spirit and principle of this application should fall within the protection scope of this application.

What is claimed is:

1. A method for forwarding a packet based on an integrated flow table, wherein the integrated flow table comprises a plurality of flow entries, each of the plurality of flow entries comprises a mapping relationship between a match item and an operation set, the match item comprises a plurality of packet header fields, the operation set comprises a forwarding operation, and the method comprises:
   obtaining a first packet;
   extracting N packet header field sets from a packet header of the first packet, wherein each of the N packet header field sets comprises a plurality of first packet header fields and each of the N packet header field sets has a different combination of packet header fields than any other packet header field sets in the N packet header field sets, wherein the plurality of first packet header fields of each of the N packet header field sets have same categories as a plurality of packet header fields comprised in one of the plurality of flow entries, wherein N is an integer greater than 1;
   searching the integrated flow table for a target flow entry matching one of the N packet header field sets, to determine an operation set corresponding to the first packet, wherein the operation set corresponding to the first packet comprises other operations performed on the first packet between the operation of determining the operation set corresponding to the first packet and the forwarding operation;
   performing the other operations in the operation set on the first packet, to obtain a second packet corresponding to the first packet; and
   forwarding the second packet.

2. The method of claim 1, wherein the extracting N packet header field sets from a packet header of the first packet comprises:
   performing an AND operation on the packet header of the first packet and a mask, to obtain the plurality of first packet header fields in one of the N packet header field sets, wherein the mask indicates locations of the plurality of first packet header fields in the one of the N packet header field sets in the packet header of the first packet.

3. The method of claim 2, wherein the method further comprises:
   generating the mask, wherein the mask and the packet header of the first packet have a same byte length, and non-zero bits in the mask correspond to a plurality of packet header fields comprised in the target flow entry.

4. The method of claim 1, wherein the plurality of flow entries are located in a plurality of rows of the integrated flow table, each of the plurality of rows of the integrated flow table corresponds to an expiration time, the expiration time indicates a moment of deleting a flow entry in the row corresponding to the expiration time from the integrated flow table, the target flow entry is located in a row corresponding to a first expiration time, and the method further comprises:

after the searching the integrated flow table for a target flow entry matching one of the N packet header field sets, to determine an operation set corresponding to the first packet, moving the target flow entry from the row corresponding to the first expiration time to a row corresponding to a second expiration time, wherein the second expiration time is later than the first expiration time.

5. The method of claim 1, wherein the method further comprises:

obtaining a third packet;

extracting a plurality of second packet header fields from a packet header of the third packet, wherein the plurality of second packet header fields have same categories as the plurality of packet header fields comprised in one of the plurality of flow entries;

when the integrated flow table does not comprise a target flow entry matching the plurality of second packet header fields, obtaining at least one operation corresponding to the third packet from an open virtual switch (OVS), wherein the at least one operation comprises a forwarding operation; and performing the at least one operation on the third packet.

6. The method of claim 1, wherein the other operations comprise one or more of the following operations: an operation of adding a field to a packet header, an operation of deleting a field from a packet header, an operation of modifying content of a field in a packet header, an operation of setting a priority of a packet, or an operation of setting connection tracking.

7. An apparatus for forwarding a packet based on an integrated flow table, wherein the apparatus comprises:

at least one processor, and
a memory coupled to the at least one processor and configured to store a plurality of instructions that, when executed by the processor, causes the at least one processor to:
obtain a first packet;
extract N packet header field sets from a packet header of the first packet, wherein each of the N packet header field sets comprises a plurality of first packet header fields and each of the N packet header field sets has a different combination of packet header fields than any other packet header field sets in the N packet header field sets, wherein the integrated flow table comprises a plurality of flow entries, each of the plurality of flow entries comprises a mapping relationship between a match item and an operation set, the match item comprises a plurality of packet header fields, the operation set comprises a forwarding operation, and wherein the plurality of first packet header fields of each of the N packet header field sets have same categories as a plurality of packet header fields comprised in one of the plurality of flow entries, wherein N is an integer greater than 1;
search the integrated flow table for a target flow entry matching one of the N packet header field sets, to determine an operation set corresponding to the first packet, wherein the operation set corresponding to the first packet comprises other operations performed on the first packet between the operation of determining the operation set corresponding to the first packet and the forwarding operation;
perform the other operations in the operation set on the first packet, to obtain a second packet corresponding to the first packet; and
forward the second packet.

8. The apparatus of claim 7, wherein the instructions further cause the at least one processor to:

perform an AND operation on the packet header of the first packet and a mask, to obtain the plurality of first packet header fields in one of the N packet header field sets, wherein the mask indicates locations of the plurality of first packet header fields in the one of the N packet header field sets in the packet header of the first packet.

9. The apparatus of claim 8, wherein the instructions further cause the at least one processor to:

generate the mask, wherein the mask and the packet header of the first packet have a same byte length, and non-zero bits in the mask correspond to a plurality of packet header fields comprised in the target flow entry.

10. The apparatus of claim 7, wherein the plurality of flow entries are located in a plurality of rows of the integrated flow table, each of the plurality of rows of the integrated flow table corresponds to an expiration time, the expiration time indicates a moment of deleting a flow entry in the row corresponding to the expiration time from the integrated flow table, the target flow entry is located in a row corresponding to a first expiration time, and wherein the instructions further cause the at least one processor to:

after the searching the integrated flow table for a target flow entry matching one of the N packet header field sets, to determine an operation set corresponding to the first packet, moving the target flow entry from the row corresponding to the first expiration time to a row corresponding to a second expiration time, wherein the second expiration time is later than the first expiration time.

11. The apparatus of claim 7, wherein the instructions further cause the at least one processor to:

obtain a third packet;
extract a plurality of second packet header fields from a packet header of the third packet, wherein the plurality of second packet header fields have same categories as the plurality of packet header fields comprised in one of the plurality of flow entries;
when the integrated flow table does not comprise a target flow entry matching the plurality of second packet header fields, obtain at least one operation corresponding to the third packet from an open virtual switch (OVS), wherein the at least one operation comprises a forwarding operation; and
perform the at least one operation on the third packet.

12. The apparatus of claim 7, wherein the other operations comprise one or more of the following operations: an operation of adding a field to a packet header, an operation of deleting a field from a packet header, an operation of modifying content of a field in a packet header, an operation of setting a priority of a packet, or an operation of setting connection tracking.

13. A computer program product comprising computer-executable instructions stored on a non-transitory computer-readable medium that, when executed by at least one processor, cause an apparatus to:
obtain a first packet;
extract N packet header field sets from a packet header of the first packet, wherein each of the N packet header field sets comprises a plurality of first packet header fields and each of the N packet header field sets has a different combination of packet header fields than any of the other packet header field sets in the N packet header field sets, wherein an integrated flow table comprises a plurality of flow entries, each of the plurality of flow entries comprises a mapping relationship between a match item and an operation set, the match item comprises a plurality of packet header fields, the operation set comprises a forwarding operation, and wherein the plurality of first packet header fields of each of the N packet header field sets have same categories as a plurality of packet header fields comprised in one of the plurality of flow entries, wherein N is an integer greater than 1;
search the integrated flow table for a target flow entry matching one of the N packet header field sets, to determine an operation set corresponding to the first packet, wherein the operation set corresponding to the first packet comprises other operations performed on the first packet between the operation of determining the operation set corresponding to the first packet and the forwarding operation;
perform the other operations in the operation set on the first packet, to obtain a second packet corresponding to the first packet; and
forwarding the second packet.

14. The computer program product of claim 13, wherein the computer program product further causes the apparatus to: performing an AND operation on the packet header of the first packet and a mask, to obtain the plurality of first packet header fields in one of the N packet header field sets, wherein the mask indicates locations of the plurality of first packet header fields in the one of the N packet header field sets in the packet header of the first packet.

15. The computer program product of claim 14, wherein the computer program product further causes the apparatus to: generate the mask, wherein the mask and the packet header of the first packet have a same byte length, and non-zero bits in the mask correspond to a plurality of packet header fields comprised in the target flow entry.

16. The computer program product of claim 13, wherein the plurality of flow entries are located in a plurality of rows of the integrated flow table, each of the plurality of rows of the integrated flow table corresponds to an expiration time, the expiration time indicates a moment of deleting a flow entry in the row corresponding to the expiration time from the integrated flow table, the target flow entry is located in a row corresponding to a first expiration time, and wherein the computer program product further causes the apparatus to: after the searching the integrated flow table for a target flow entry matching one of the N packet header field sets, to determine an operation set corresponding to the first packet, moving the target flow entry from the row corresponding to the first expiration time to a row corresponding to a second expiration time, wherein the second expiration time is later than the first expiration time.

17. The computer program product of claim 13, wherein the computer program product further causes the apparatus to:
obtain a third packet;
extract a plurality of second packet header fields from a packet header of the third packet, wherein the plurality of second packet header fields have same categories as the plurality of packet header fields comprised in one of the plurality of flow entries;
when the integrated flow table does not comprise a target flow entry matching the plurality of second packet header fields, obtain at least one operation corresponding to the third packet from an open virtual switch (OVS), wherein the at least one operation comprises a forwarding operation; and
perform the at least one operation on the third packet.

18. The computer program product of claim 13, wherein the other operations comprise one or more of the following operations: an operation of adding a field to a packet header, an operation of deleting a field from a packet header, an operation of modifying content of a field in a packet header, an operation of setting a priority of a packet, or an operation of setting connection tracking.

\* \* \* \* \*

UNITED STATES PATENT AND TRADEMARK OFFICE
CERTIFICATE OF CORRECTION

PATENT NO. : 11,496,393 B2
APPLICATION NO. : 16/725247
DATED : November 8, 2022
INVENTOR(S) : Kun Tan and Wei-liang Shen Page 1 of 1

It is certified that error appears in the above-identified patent and that said Letters Patent is hereby corrected as shown below:

In the Claims

Column 33 Line 9 Claim 13, before "other" delete "of the".

Signed and Sealed this
Twenty-fifth Day of April, 2023

Katherine Kelly Vidal
*Director of the United States Patent and Trademark Office*